US009076416B2

(12) United States Patent
Nielsen et al.

(10) Patent No.: US 9,076,416 B2
(45) **Date of Patent: *Jul. 7, 2015**

(54) POLYPHONIC TUNER

(71) Applicant: THE TC GROUP A/S, Risskov (DK)

(72) Inventors: Soren Henningsen Nielsen, Lystrup (DK); Esben Skovenborg, Arhus C (DK); Lars Arknaes-Pedersen, Viby J (DK); Kim Rishoj Pedersen, Ega (DK)

(73) Assignee: THE TC GROUP A/S (DK)

( * ) Notice: Subject to any disclaimer, the term of this patent is extended or adjusted under 35 U.S.C. 154(b) by 197 days.

This patent is subject to a terminal disclaimer.

(21) Appl. No.: 13/723,839

(22) Filed: Dec. 21, 2012

(65) Prior Publication Data

US 2013/0112063 A1 May 9, 2013

Related U.S. Application Data

(63) Continuation of application No. 12/857,136, filed on Aug. 16, 2010, now Pat. No. 8,338,683.

(60) Provisional application No. 61/233,933, filed on Aug. 14, 2009.

(51) Int. Cl.

| | |
|---|---|
| ***G01G 7/02*** | (2006.01) |
| ***G10G 7/02*** | (2006.01) |
| ***G10H 1/00*** | (2006.01) |
| *G10H 3/12* | (2006.01) |

(52) U.S. Cl.
CPC .................. *G10G 7/02* (2013.01); *G10H 3/125* (2013.01); *G10H 1/0008* (2013.01); *G10H 2210/066* (2013.01); *G10H 2220/005* (2013.01)

(58) Field of Classification Search
CPC ............ G10H 2210/066; G10H 3/125; G10H 2210/081; G10H 3/186; G10H 1/383; G10H 2220/101; G10H 1/44; G10H 2220/076; G10G 7/02; G10G 1/02; G10G 1/00; G10G 3/04; G10D 3/14; G10F 1/00
See application file for complete search history.

(56) References Cited

U.S. PATENT DOCUMENTS

| | | | | |
|---|---|---|---|---|
| 3,766,818 | A * | 10/1973 | Prohofsky | 84/454 |
| 5,427,011 | A * | 6/1995 | Steinberger | 84/454 |
| 5,773,737 | A * | 6/1998 | Reyburn | 84/454 |
| 5,777,248 | A * | 7/1998 | Campbell | 84/454 |
| 5,877,443 | A * | 3/1999 | Arends et al. | 84/454 |
| 5,977,467 | A * | 11/1999 | Freeland et al. | 84/454 |
| 6,965,067 | B2 * | 11/2005 | Kondo | 84/455 |
| 7,049,502 | B2 * | 5/2006 | Taku et al. | 84/454 |
| 7,285,710 | B1 * | 10/2007 | Wallace | 84/454 |
| 7,371,954 | B2 * | 5/2008 | Masuda et al. | 84/454 |
| 7,504,575 | B2 * | 3/2009 | Schwartz | 84/637 |
| 7,598,447 | B2 * | 10/2009 | Walker et al. | 84/616 |
| 7,678,985 | B2 * | 3/2010 | Adams et al. | 84/645 |
| 8,334,449 | B2 * | 12/2012 | Nielsen et al. | 84/454 |
| 8,338,683 | B2 * | 12/2012 | Nielsen et al. | 84/454 |
| 8,350,141 | B2 * | 1/2013 | Nielsen et al. | 84/454 |
| 8,373,053 | B2 * | 2/2013 | Nielsen et al. | 84/454 |
| 8,592,670 | B2 * | 11/2013 | Gehring et al. | 84/616 |
| 8,664,501 | B2 * | 3/2014 | Miele et al. | 84/454 |
| 2004/0020346 | A1 * | 2/2004 | Kondo | 84/454 |
| 2004/0231496 | A1 | 11/2004 | Schwartz | |
| 2005/0087060 | A1 * | 4/2005 | Taku et al. | 84/455 |
| 2006/0027074 | A1 * | 2/2006 | Masuda et al. | 84/454 |

(Continued)

*Primary Examiner* — Marlon Fletcher
(74) *Attorney, Agent, or Firm* — Cantor Colburn LLP

(57) ABSTRACT

The present invention relates to a musical instrument tuner, e.g. a guitar tuner, featuring tuning as a part of a user session.

31 Claims, 12 Drawing Sheets

(56) References Cited

U.S. PATENT DOCUMENTS

| | | | | |
|---|---|---|---|---|
| 2006/0174754 | A1* | 8/2006 | Yamada | 84/723 |
| 2007/0079688 | A1* | 4/2007 | Okuyama et al. | 84/454 |
| 2007/0095196 | A1* | 5/2007 | Yagi et al. | 84/612 |
| 2007/0234880 | A1* | 10/2007 | Adams et al. | 84/601 |
| 2008/0173161 | A1* | 7/2008 | Schwartz | 84/637 |
| 2008/0295676 | A1* | 12/2008 | Yamada | 84/741 |
| 2011/0103600 | A1* | 5/2011 | Nakayama | 381/58 |
| 2011/0247480 | A1* | 10/2011 | Gehring et al. | 84/613 |
| 2012/0067192 | A1* | 3/2012 | Nielsen et al. | 84/454 |
| 2012/0067193 | A1* | 3/2012 | Nielsen et al. | 84/454 |
| 2012/0067194 | A1* | 3/2012 | Nielsen et al. | 84/454 |
| 2012/0204702 | A1 | 8/2012 | Nielsen | |
| 2012/0243379 | A1* | 9/2012 | Balli | 368/10 |
| 2013/0025435 | A1* | 1/2013 | Rutledge et al. | 84/613 |
| 2013/0112063 | A1* | 5/2013 | Nielsen et al. | 84/454 |
| 2013/0112065 | A1* | 5/2013 | Rutledge et al. | 84/603 |
| 2013/0139672 | A1* | 6/2013 | Ribner | 84/602 |
| 2013/0145921 | A1* | 6/2013 | Ribner | 84/454 |
| 2013/0186253 | A1* | 7/2013 | Nielsen et al. | 84/267 |
| 2014/0137720 | A1* | 5/2014 | Yui et al. | 84/454 |

* cited by examiner

POLYPHONIC TUNER

CROSS REFERENCE TO RELATED APPLICATIONS

This application is a continuation of U.S. patent application Ser. No. 12/857,136 filed on 16 Aug. 2010 which claims the priority of U.S. Provisional Application Ser. No. 61/233,933 filed on 14 Aug. 2009, where the contents of said applications are hereby incorporated by reference in their entirety.

FIELD OF THE INVENTION

The present invention relates to a tuning device for a musical instrument, such as a guitar.

BACKGROUND OF THE INVENTION

A conventional tuning device for musical instruments, such as disclosed in U.S. Pat. No. 4,429,609 by Warrender, U.S. Pat. No. 4,457,203 by Schoenberg et al., U.S. Pat. No. 7,288,709 by Chiba and US 2006/0185499A1 by D'Addario et al., all hereby incorporated by reference, can measure one pitch frequency at a time and display the frequency deviation between the input signal and a target frequency. If a polyphonic signal, such as two pitch frequencies simultaneously, is fed to a conventional tuning device the display will typically be blank, indicating that no valid input was detected.

In many practical situations the musician does not hear the instrument while tuning, as this would be disturbing for an audience. Furthermore, the time to correct tuning of the instrument is often limited, as for instance in the break between songs in a performance. It is therefore important that the tuning device provides a user-friendly and appropriate output and works reliably and fast.

In order to tune an instrument like a guitar, which typically has six strings, each string must be plucked separately and the tuning must be adjusted until the deviation is sufficiently small.

In such a conventional tuning device verification of correct tuning requires that each string is plucked separately. This process is time-consuming.

Sometimes just one of six strings is out of tune, but in order to identify which string it is and subsequently correct the tuning each string must be checked. When using a conventional tuning device this checking process is of a serial nature, in that only one string at a time can be measured.

In many guitars adjusting the tuning of one string influences the tuning of the other strings. This is caused by the changed mechanical tension in the string being tuned, and therefore changed overall tension of the strings. As a guitar neck and body does posses some elasticity, tensioning one string will cause the tension of the other strings to be reduced slightly, due to bending of the neck and body, and thus potentially cause a need for re-tuning the other strings. A simultaneous display of the tuning of all six strings could be helpful when such a guitar is being tuned.

Some musical instrument tuners are generally applicable in that they have display means for indicating all 12 semitone names (from the chromatic scale). Such a tuner is commonly called "chromatic". Notice that the pattern of 12 semitones repeats for each musical octave through the frequency (or pitch) range. In Western music the tone names are A, B, C, D, E, F, G plus an optional semi-tone step indicated by # or b (sharp or flat).

Other musical instrument tuners are specialised for instance for guitar use, such that only the tone names corresponding to the nominal values of the six strings: E, A, D, G, B, E, can be shown.

In general, conventional tuning devices do not require any modifications to the musical instrument in order to be usable.

The problem of tuning a guitar can also be solved using automatic means. An element of such a system is a measurement part, which by using one method or another, measures the tuning of each string. Such systems may work only for a single string at a time, whereas others may work on all strings simultaneously.

One such automatic tuning system is described in U.S. Pat. No. 4,803,908 by Skinn et al., where the sound signal for each string is measured separately by means of a pick-up for each string. So apart from the motors, gears, etc. needed to adjust the tuning automatically, the guitar must also be equipped with a special pick-up system.

In U.S. Pat. No. 4,375,180 by Scholz is described a system for automatic tuning of a guitar where the measurement of frequency is based on a mechanical measurement of the tension of each string, compared to a reference. That system is also dependent on a modification to a standard guitar, even for just the measurement part.

Another tuning device, in which frequency deviations for more than one string at time can be measured and displayed, is disclosed in U.S. Pat. No. 6,066,790 by Freeland et al., hereby incorporated by reference. This system can use a single channel pick-up, common for all strings, for measurement of all strings simultaneously. Hereby some disadvantages of the conventional tuning devices are reduced. However, according to the disclosure of U.S. Pat. No. 6,066,790, the same display format is used whether one or several strings are played at a time. If just a single string is being tuned only a small part of the display is used for showing relevant information. Moreover, the tuner disclosed in U.S. Pat. No. 6,066,790 is fixed with regard to the e.g. six frequency bands that are tied to a certain instrument type, e.g. a guitar, and the display configuration. Hence, the tuner only provides useful information for strings that are within a limited range of their correct tuning. In other words, a chromatic tuner cannot be derived from the disclosure of U.S. Pat. No. 6,066,790.

It is an object of the present invention to provide a tuner that enables an unmodified guitar to be tuned easily by strumming/playing the strings simultaneously, and also facilitates precision tuning of individual strings.

It is an object of the present invention to provide a tuner with an improved visual output.

It is an object of the present invention to provide a tuner that enables simultaneous pitch frequency determination of several strings for a conventional guitar where a single audio channel is common for all six strings.

It is an object of the present invention to provide a tuner where the display shows sensible/usable information for most types of input signal, in particular monophonic and polyphonic signals.

A further problem related to the prior art is that this prior art is relatively difficult to operate due to the fact that such techniques are more suitable for skilled technicians rather than supporting the acting musician.

SUMMARY OF THE INVENTION

The invention relates to a method for operating a musical instrument tuner, the tuner comprising an input module, a signal analyzer, a display, a housing, a user interface, the input module, the signal analyzer and the display forming a part of said housing or being comprised in said housing, the input module receiving an input signal from a musical instrument, the user interface comprising a mode selector, the display enabling at least two display modes from a group of display modes, the display modes comprising monophonic display mode and polyphonic display mode, the method comprising the steps of initiating a user session mode, the user session mode being selected among a set of user session modes, the set of user session modes comprising a polyphonic mode and a monophonic mode, the method further comprising the step of shifting the session mode from one of the previously selected user session modes to another user session mode in response to an input established by a user by means of said mode selector, when the user session mode is selected to be the polyphonic mode, establishing a polyphonic characteristic of the input signal, the polyphonic characteristic including representations of multiple pitch frequencies derived from said input signal, and displaying said polyphonic characteristic in a polyphonic display mode on said display, when the user session mode is selected to be the monophonic mode, establishing a monophonic characteristic of the input signal, the monophonic characteristic including a representation of a pitch frequency derived from said input signal (IS), and displaying said monophonic characteristic in a monophonic display mode on said display.

The user session modes defines modes in which the user of the musical instrument tuner is playing and especially the mode in which the user is playing when the user needs to tune e.g. one or more strings of a guitar. There may be a plurality of different user session modes including e.g. polyphonic mode, monophonic mode, chord mode and user specific modes.

It may be advantageous for the user to be able to decide in which user session mode the musical instrument tuner should interpret the input signal from the user's music instrument. Where the user needs to tune one string at a time it is advantageous to be able to switch to monophonic mode and where the user needs to tune two or more strings at a time it is advantageous to be able to switch to polyphonic mode.

It should be noted that the musical instrument tuner of course also may be equipped with hardware/software which may perform an automatic detection of the input signal and then automatically determine the user session mode.

The musical instrument tuner is not limited to assist in tuning guitars or bass guitars hence with appropriate input modules the musical instrument tuner may also assist in tuning music instruments such as a harp or a banjo or non-string instrument.

The target pitch frequency should be understood as the pitch frequency that the user wants to associate with e.g. a specific string of a guitar, preferably according to a standard tuning of e.g. a guitar, but it could equally well be a predetermined custom tuning.

It is advantageous to be able to switch between e.g. polyphonic mode and monophonic mode and especially during live performance where time is short between two live songs. Even with the short time between two live tracks it is possible for the user of the musical instrument tuner to strike all six strings of a guitar and with the musical instrument tuner in polyphonic mode the user obtains information of the pitches of all six strings and maybe also information on how much these strings are out of tune.

If all strings are acceptable tuned except for one string the user may switch the user session mode to monophonic mode and thereby get further details or better resolution on the display of the pitch frequency from that string which is out of tune which may provide the user with better basis for tuning the specific string.

By selecting a user session mode the user has also indirectly selected a display mode and thereby determined how the characteristics of the input signal should be display on the display of the musical instrument tuner.

According to an embodiment of the invention, when the user session mode is chosen to be polyphonic mode the display mode is chosen to be polyphonic display mode and in the same way when the user session mode is chosen to be monophonic mode the display mode is chosen to be monophonic display mode.

Still according to an embodiment of the invention, the polyphonic display mode is optimized to display more than one characteristic of an input signal simultaneously while the monophonic display mode is optimized to display only one characteristic of an input signal.

It should be mentioned that several different monophonic display modes may be provided, e.g. needle mode, stroboscopic mode, etc., as well as several different polyphonic display modes, and that even though visible information is preferred, display modes may provide audible information, possibly in combination with the visible information.

Furthermore the ability to switch between different session modes allows the user to get displayed only the information which is important to the user. Hence if only one string of a guitar needs to be tuned it may be advantageous to be able to switch to monophonic mode/monophonic display mode and thereby use all the processor power and display opportunities on information of this particular string. After tuning this string it might be relevant to switch to polyphonic mode/polyphonic display mode to get an overview of all strings and e.g. see how the tuning of the one sting affected the tuning of the rest of the stings.

Furthermore if a string is damaged and should be replaced this string, when replaced, may be very much out of tune. In this situation this string may not be detected or may be misinterpreted by the polyphonic algorithm used by the musical instrument tuner in the polyphonic mode e.g. because the pitch frequency from the new string may be out of range of the polyphonic algorithm. Hence by changing the user session mode e.g. to monophonic mode necessary information of the string and maybe also actions to be taken to tune the string can be provided because the monophonic algorithm may detect pitches in the entire frequency spectrum. One example here could e.g. be where the musical instrument tuner is in polyphonic mode, then it may misinterpret the new string with one of the other strings which could lead to an erroneous tuning of the new string. As mentioned this misinterpretation may be avoided by switching user session mode to monophonic mode.

The risk of erroneous tuning may be minimized if the user session mode of the musical instrument tuner is changed to monophonic mode which may cover the entire frequency spectrum relevant for music instruments.

It should be mentioned that if the user is able to tune in the new string more or less accurate the musical instrument tuner in both monophonic mode and polyphonic mode can assist the user in the final fine tuning of the new string.

The risk of erroneous tuning may be completely eliminated if the musical instrument tuner moreover facilitates a selection of a specific string e.g. by using the multi switch. Hence if the user configures the musical instrument tuner to monophonic mode and further configures the musical instrument tuner to the specific string, the musical instrument tuner is a very powerful tool assisting even the inexperienced musician with the tuning of that specific string of the musical instrument.

It should be noted that the musical instrument tuner may also sometimes be referred to as musical tuning device, tuning device or simply tuner It should be noted that the mode selector e.g. switching between the polyphonic mode and the monophonic mode may either be operatable automatic or manually.

In an embodiment of the invention said mode selector comprises a manual switch operated by a user.

It may be very advantageous for the user of the musical instrument tuner to be able to decide how the musical instrument tuner should interpret the input signal and thereby also how the musical instrument tuner displays the characteristics of the input signal originating from a musical instrument. Hence it is up to the user to decide whether to be provided with a detailed view of one pitch frequency or a less detailed view of more than one pitch frequencies.

In an embodiment of the invention said mode selector comprises a mechanical switch operated by a user.

In an embodiment of the invention said mode selector comprises a manual switch operated by a user and wherein the manual switch is integrated in the housing.

It may be very advantageous to integrate the mode selector in the housing comprising the musical instrument tuner because then the musical instrument tuner becomes one compact unit which is easy to bring along for the user. Hence the musical instrument tuner may preferably be a standalone device but it should be noted that the musical instrument tuner may communicate with one or more displays not integrated in the musical instrument tuner.

In an embodiment of the invention said mode selector comprises a manual switch operated by a user and wherein said manual switch comprises a footswitch or a switch operatable by hand.

In an embodiment of the invention said mode selector comprises a manual switch operated by a user and wherein the manual switch is integrated in the housing and wherein said manual switch comprises a footswitch.

It may be very advantageous to be able to operate the mode selector with a foot, because it enables the user to operate both the musical instrument tuner and the musical instrument at the same time.

In an embodiment of the invention said multiple different pitch frequencies originates from strumming of two or more strings of a musical instrument.

In an embodiment of the invention the polyphonic algorithm for establishing polyphonic characteristics and monophonic algorithm for establishing monophonic characteristics from an input signal are the same.

It may reduce need of components or costs of components to use the same algorithm for establishing both monophonic characteristics and polyphonic characteristics. Furthermore it may simplify the construction of the musical instrument tuner.

According to an embodiment of the invention the algorithm may always try to establish polyphonic characteristics from the input signal but when it finds only one pitch frequency it might be because the input signal is a monophonic signal and the established characteristics can be displayed according to a monophonic display mode.

In an embodiment of the invention the polyphonic algorithm for establishing polyphonic characteristics and monophonic algorithm for establishing monophonic characteristics from an input signal are not the same.

In case the polyphonic algorithm is developed specifically to establish polyphonic characteristics and the monophonic algorithm is developed specifically to establish monophonic characteristics the individual algorithms may be optimized to that specific purpose. Thereby the processing speed may be increased.

Alternatively the part of the polyphonic algorithm and the monophonic algorithm establishing characteristics of the input signal may be the same but the part of the algorithm determining the display mode or preparing the visual output may differ. In a further embodiment, the polyphonic algorithm is used to establish initial characteristics regardless of the user session mode, and then if monophonic user session mode is selected, a monophonic algorithm is applied to refine the characteristics for the single pitch frequency.

In an embodiment of the invention said user session mode is determined automatically by the musical instrument tuner, e.g. by means of a signal classifier calculating a time domain function or a frequency domain transform of said input signal and depending on said function or transform performing pattern recognition to determine a user session mode among e.g. a polyphonic and a monophonic user session mode.

In an embodiment of the invention said musical instrument tuner is automatically detecting said target pitch frequency in the monophonic mode.

According to a preferred embodiment, the musical instrument tuner automatically compares the single played pitch frequency to the best match among the pitch frequencies of e.g. a standard guitar tuning, standard bass guitar tuning, a custom tuning, etc. In other words, the musical instrument tuner automatically determines what string is being played, and uses this information to determine which target pitch frequency to compare with.

In an embodiment of the invention said user session mode is determined automatically by the musical instrument tuner and wherein said mode selector facilitates overruling said automatically determined user session mode.

In case of automatic detection of user session mode, it may be very advantageous for the user to be able to overrule the automatically determined user session mode. This is especially the case where e.g. the polyphonic mode is automatically determined and the user instead would like to focus the tuning on one string without having to carefully avoiding touching the other strings. The overrule functionality may also be advantageous where the musical instrument tuner automatically has determined the user session mode to be monophonic mode but the user would rather like to have an overview displayed according to a preferred polyphonic display mode.

The overrule functionality may be implemented via a multi switch.

In an embodiment of the invention said multiple pitch frequencies of said polyphonic characteristic refers to predetermined target pitch frequencies The musical instrument tuner may advantageously compare the established pitch frequencies with predetermined target pitch frequencies e.g. to be able to determine distance from the established pitch frequencies to the related target pitch frequencies or simply determine which tones the established pitch frequencies correspond to.

In an embodiment of the invention said pitch frequency of said monophonic characteristic refers to a predetermined target pitch frequency The musical instrument tuner may advantageously compare the established pitch frequency with a predetermined target pitch frequency e.g. to be able to determine distance from an established pitch frequency to the related target pitch frequency or simply determine which tone the established pitch frequency correspond to.

In an embodiment of the invention said at least one characteristic comprises a representation of a pitch frequency or a deviation from a target pitch frequency when said user session mode is monophonic;

and said at least one characteristic comprises several representations of pitch frequencies or several deviations from one or more target pitch frequencies when said user session mode is polyphonic.

A primary characteristic measured by a musical instrument tuner is the deviation from reference or target pitch frequencies. Different measurement methods for monophonic and polyphonic signals are suitable.

In an embodiment of the invention said target pitch frequency is determined automatically on the basis of said pitch frequency or determined by a user.

In an embodiment of the invention said display is arranged with a well-defined behaviour for use for input signals where said display modes are unsuitable.

In an embodiment of the invention said set of user session modes comprises a bypass user session mode.

When the musical instrument tuner facilitates the input signal to be transmitted further on to e.g. an amplifier or pedals, it may be very advantageous to be able to perform a true bypass of the input signal i.e. bypassing the processing of the input signal in the musical instrument tuner. In this way the quality of the input signal before the musical instrument tuner is the same or near the same as the quality of the input signal after the musical instrument tuner.

In an embodiment of the invention said set of user session modes comprises two or more polyphonic user session modes, comprising at least a polyphonic guitar mode and a polyphonic bass guitar mode.

In an embodiment of the invention said signal analyzer comprises a monophonic pitch detector and a polyphonic pitch detector.

The primary characteristic measured by a musical instrument tuner is the pitch frequency, especially the deviation from the reference or target pitch frequencies. When determining the pitch frequency of a tone, different measurement methods for monophonic and polyphonic signals are suitable. The pitch detection may be advantageously done in said signal analyzer of the tuner.

In an embodiment of the invention said input signal is a single channel audio signal.

It is a very advantageous aspect of the present invention that the musical instrument tuner can be used together with unmodified instruments, which normally only have an audio single channel common for all strings.

It should be noted that the input signal may also sometimes be referred to as audio signal.

In an embodiment of the invention said musical instrument tuner comprises an input signal conditioner.

In an embodiment of the invention said input signal conditioner comprises a hum filter.

In an embodiment of the invention a polyphonic display mode and a monophonic display mode may be displayed at the same time or one at a time by the display.

It may be very advantageous to be able to view the monophonic display mode at the same time as the polyphonic display mode, i.e. both the high and low resolution views, because this facilitates that the musician at the same time has both an overview of all strings and a detailed view of one string to be fine tuned. The string to represent in the monophonic display mode in a situation where information of several strings are available may be determined in different ways, e.g. manually by the user, semi-automatically by the user by selecting a target tone to match, a key or a tuning scheme, or automatically as the string most out of tune, the string that is considered most important to be correctly tuned, the string whose tuning is currently changing the most because the user is in a process of tuning it, or the string may be selected according to any other way that suits a user of an instrument tuner.

In an embodiment of the invention said musical instrument tuner comprises a signal classifier for determining a signal class of the input signal from a group of classes at least comprising one or more monophonic signal classes and one or more polyphonic signal classes, and wherein a display mode to be displayed is determined on the basis of said signal class.

By classifying the input signal to a musical instrument tuner into either a monophonic or polyphonic class the tuner can measure and display signal characteristics in an optimum way depending on the classification. This is in particular useful in an embodiment designed for only displaying one display mode at a time, as with such an embodiment the user would otherwise have to select a display mode manually.

This advantageous embodiment enables automatic changes between different display modes which facilitates user-friendly, reliable and accurate indication of either monophonic or polyphonic characteristics, and thus a conventional, unmodified guitar can be tuned easily by strumming/playing the strings simultaneously, or one string at a time as the user wishes, without requiring the user to change the display mode accordingly. The automatic signal classifier, also referred to as signal type classification means, may in an embodiment of the invention also enable automatic change between mono- and poly detection algorithms.

Hence, the present embodiment also provides a tuner with an improved visual output because it always can utilize the available display means to show as much usable information as possible about the input signal, because it actually knows, due to the classifier, how much information is usable. The tuner of the present invention shows sensible/usable information for most types of input signal, in particular monophonic and polyphonic signals.

A signal class is defined by certain properties that the input signal can have. Basically, input signals are according to the present invention classified as either belonging to a monophonic signal class, preferably defined by the property of containing a single pitch, or to a polyphonic signal class, preferably defined by the property of containing two or more pitches. It is noted, however, that more advanced embodiments of the present invention provides for further signal classes to be available, including variations of the generic monophonic and polyphonic signal classes, e.g. a guitar polyphonic signal class for signals having the property of containing between two and six pitches related to a conventional guitar tuning, and a bass polyphonic signal class for signals having the property of containing between two and four pitches related to a conventional 4-string bass tuning, or even a 6-string guitar polyphonic class as well as a 7-string guitar polyphonic class. The monophonic class could likewise be subdivided into a guitar monophonic class and a bass monophonic class, etc. Among other things the more detailed classification can be used to control the display, e.g. how many strings should be illustrated in a polyphonic mode, or to control the pitch detection and other analysis, e.g. the choice of signal analyzer algorithm or the use of a specific input signal conditioner, e.g. a pre-emphasis filter.

Also classification based on other properties than the number and value of pitches or in combination therewith, is within the scope of the present invention. For example, spectral features of the input signal, e.g. the spectral envelope, may be employed in combination with or instead of pitch information, in a classification distinguishing between, e.g. guitar or bass, and thereby automatically change between variants of the signal analyzer each of which can provide a more accurate, robust, or responsive analysis, for the particular signal class.

One of the variations of the monophonic and polyphonic signal classes is used in an embodiment of the invention where a polyphonic pitch detector is simply provided for both classifier and pitch detector for both polyphonic and monophonic signals. The classification is simply made on the basis of the output of the polyphonic pitch detector, but in this case it might not be reliable to classify two-or-more pitch signals as polyphonic signals. This is because a simple polyphonic pitch detector would often erroneously recognize activity in e.g. both the low-E, A and high-E bands of a guitar when just the low-E string is plucked due to the similarity of fundamentals and harmonics of these strings. A simple, though also non-optimal, measure to avoid erroneous classification of certain monophonic signals as belonging to a polyphonic signal class would be to define the monophonic signal class as all signals with apparently e.g. three or less pitches, or only signals with apparently e.g. three or less pitches having a harmonic relationship.

A tuner comprising a simple polyphonic pitch detector which in practice acts as a simple classifier as described above is thus considered within the scope of the present invention, as is a tuner comprising a simple monophonic pitch detector which in practice acts as a simple classifier by e.g. causing a polyphonic pitch detection to be carried out when the output from the monophonic pitch detector is unclear.

An advanced embodiment of the invention provides a set of polyphonic signal classes corresponding to different chord-types. A chord may consist of, for example, three pitches with certain frequency-relations to each other. As playing chords are typically a part of playing e.g. the guitar, this embodiment may allow an even more natural and effective tuning application, as the guitar then can be tuned while the musician is playing, provided the chord can be held long enough for the tuner to detect the pitches and determine if a string is out of tune. It is noted that the normal, simple tuning with loose strings is in principle just a special case of the chord tuning, as the normal tuning of a 6-string guitar corresponds to an Em11 chord.

In one embodiment of the above-mentioned chord tuning, the user programs in a suitable way, e.g. by use of a multi-switch or other input means of the user interface, the tuner to know the chord that is expected at the tuning time, e.g. instead of the Em11 chord for a conventional guitar tuning. This could be a specific chord that the musician uses regularly in his performance, or it could be an alternative loose-string tuning, such as e.g. an open A bar chord tuning.

In an alternative embodiment, the tuner detects the tones that are being played and if they make up a chord, it classifies the input signal as containing a certain chord and thus belongs to a specific chord class, as mentioned above. The tuner may then display the chord that is being played, and the correctness of the tuning according to the determined chord. If the musician has the skill and time available, he can tune any incorrectly tuned strings during the performance, even without good monitor conditions as has been required previously without the polyphonic chord tuner.

In yet an alternative embodiment, the classifier is arranged to analyze the harmonic relationship between pitches of the input signal, e.g. by comparing the distance in terms of semitones between the pitches. On this basis it can classify a signal as a certain type of chord.

In an embodiment of the invention said signal analyzer is coupled to or comprises said signal classifier and is arranged to determine said at least one characteristic in dependency of said signal class determined by said signal classifier.

The determination of characteristics of the input signal which are possible and relevant differ for monophonic and polyphonic input. Detection methods which are well suited for monophonic input signals often do not work on polyphonic input. Similarly, some measurement methods used on polyphonic signals do not offer sufficient range and precision for the typical use on a monophonic signal.

In an embodiment of the invention said signal classifier is arranged to determine said signal class by calculating a time domain function or a frequency domain transform of said input signal and depending on said function or transform performing pattern recognition.

Performing a suitable processing of the input signal, and apply pattern recognition is an advantageous method to determine signal classes.

In an embodiment of the invention said musical instrument tuner comprises a data storage.

It may be very advantageous to equip the musical instrument tuner with a data storage. A data storage enables the musician to store preferred musical instruments, user defined tuning profiles, tune log, mode (e.g. monophonic mode or polyphonic mode) of the input signal, desired display mode, etc. Depending on the information provided to the musical instrument tuner, the musical instrument tuner may be able to perform optimized calculations and thereby save time and energy/power.

In an embodiment of the invention said musical instrument tuner comprises an output module.

When the musical instrument tuner is equipped with an output module the musical instrument tuner may be located between the musical instrument and an amplifier, pedals, etc.

The output module may be implemented e.g. as a plug for a wire or a module for transmitting a wireless signal. Preferably the output module is capable of transmitting an output signal according to the same technology and by the same means as the input module is capable of receiving an input signal, so to allow for hassle free setup between existing components, e.g. between a guitar and a pedal array.

Moreover the invention relates to a musical instrument tuner comprising an input module arranged to receive an input signal from a musical instrument, a signal analyzer, a display arranged to enable at least two display modes from a group of display modes, the display modes comprising monophonic display mode and polyphonic display mode, a housing, a user interface comprising a mode selector, wherein the input module, the signal analyzer and the display is arranged to form a part of said housing or being comprised in said housing, wherein said mode selector is arranged to allow selection of a user session mode of said musical instrument tuner among a set of user session modes, the user session modes comprising a polyphonic mode and a monophonic mode, wherein said signal analyzer is arranged to establish one or more characteristics of said input signal in accordance with a selected user session mode, and wherein the display is arranged to convey information about said characteristics in accordance with a display mode selected according to said selected user session mode.

Moreover the invention relates to an audio processor comprising a musical instrument tuner comprising a mode selector arranged for a user of the musical instrument tuner to determine if an audio signal received by said audio processor is a monophonic signal or a polyphonic signal; wherein said musical instrument tuner is arranged to, on the basis of an output of said mode selector, display at least one characteristic of said audio signal.

Moreover the invention relates to a musical instrument amplifier comprising a musical instrument tuner comprising a mode selector arranged for a user of the musical instrument tuner to determine if an audio signal received by said musical instrument amplifier is a monophonic signal or a polyphonic signal; wherein said musical instrument tuner is arranged to, on the basis of an output of said mode selector, display at least one characteristic of said audio signal.

It may be advantageous to integrating the tuner in musical devices such as audio processors, e.g. effect processors, mixers, etc., or amplifier units.

Moreover the invention relates to a tuning measurement method for tuning a musical instrument comprising the steps of:

- receiving an audio signal generated by said musical instrument;
- determining a user session mode from a group of user session modes at least comprising
  - one or more monophonic user session modes and
  - one or more polyphonic user session modes;
- determining at least one characteristic of said audio signal; and
- displaying an output established on the basis of said user session mode and said at least one characteristic, wherein said user session mode is determined on the basis of a user operable mode selector.

In an embodiment of the invention said audio signal is a single channel audio signal.

In an embodiment of the invention said step of determining said at least one characteristic of said audio signal is carried out by an algorithm selected in dependency of said user session mode.

In an embodiment of the invention said at least one characteristic comprises a representation of a pitch frequency or a deviation of a pitch frequency from a target pitch frequency when said user session mode is determined as a monophonic user session mode;

and said at least one characteristic comprises several representations of pitch frequencies or several deviations of pitch frequencies from one or more target pitch frequencies when said user session mode is determined as a polyphonic user session mode.

In an embodiment of the invention said step of displaying said at least one characteristic comprises selecting a display mode in dependency of said user session mode of said audio signal; said display mode being selected from a group comprising at least two display modes.

In an embodiment of the invention a display mode comprising a representation of a pitch frequency or a deviation of a pitch frequency from a target pitch frequency is selected when said user session mode is a monophonic user session mode; and a display mode comprising several representations of pitch frequencies or several deviations of pitch frequencies from one or more target pitch frequencies is selected when said user session mode is a polyphonic user session mode.

In an embodiment of the invention said polyphonic user session mode comprises at least a polyphonic guitar mode and a polyphonic bass guitar mode.

In an embodiment of the invention said step of determining said at least one characteristic of said audio signal comprises employing a monophonic pitch detector or a polyphonic pitch detector.

In an embodiment of the invention said step of determining said user session mode of said audio signal comprises calculating a time domain function or a frequency domain transform of said audio signal and in dependency of said function or transform performing pattern recognition.

THE DRAWINGS

The invention will in the following be described with reference to the drawings where FIG. 1 shows the musical instrument tuner according to an embodiment of the present invention with a mode selector, FIG. 2 shows a flow diagram of the use of the musical instrument tuner according to an embodiment of the present invention, FIG. 3 shows the display of a tuner according to an embodiment of the present invention with each circle representing a lamp/display element (e.g. a light emitting diode), FIGS. 4 to 9 show the display means of a tuner according to an embodiment of the present invention indicating different conditions, FIGS. 10 to 14 show the display means of a tuner according to an embodiment of the present invention indicating different conditions, FIGS. 15 to 19 show the display means of a tuner according to an embodiment of the present invention indicating different conditions, FIGS. 20 to 23 show different ways of implementing the musical instrument tuner, FIG. 24 shows a block diagram of a musical instrument tuner according to an embodiment of the present invention, FIG. 25 shows the frequency spectrum of the low E string on a guitar, FIG. 26 shows the frequency spectrum of the high E string on a guitar, and FIG. 27 shows the frequency spectrum when all six strings on a guitar are played simultaneously.

DETAILED DESCRIPTION

The following definitions apply in the context of this document:

simultaneous display: a display of multiple images which appear to the human eye to be presented concurrently although they may actually be presented sequentially at a speed exceeding the eye's response;

real time: a time sufficiently close to the occurrence of an event as to be indistinguishable by a human observer from the actual time of the occurrence;

pitch frequency: a frequency associated with a pitch perceived from a sound, e.g. 261.626 Hz for the pitch C corresponding to the "middle C" on a piano with well-tempered tuning; a sound or corresponding audio signal may comprise several pitch frequencies, e.g. if generated by playing a chord;
target pitch frequency: a desired pitch frequency to which an instrument is to be tuned;
cents: a measure of frequency in which 100 cents equal one semitone, i.e. 1200 cents equal one octave;
frequency indicators: numbers and symbols representing either absolute or relative, or both, values of frequency (for example, a frequency displayed as a note and an offset in cents); and
wherein the terms frequency and period are regarded as equally unambiguous measures of frequency.

FIG. 1 illustrates the musical instrument tuner MIT in a preferred embodiment where the musical instrument tuner MIT comprises a housing H, an input module IM, a power supply input PSI, signal analyser SA, a user interface UI and a display D.

The housing H protects the components forming the musical instrument tuner MIT and because of the housing H the musical instrument tuner MIT is portable and at least to some extent protected against collisions and operatable e.g. by the foot or hand of a user.

The input module IM enables the musical instrument tuner MIT to receive input signals from musical instruments (not illustrated). A musical instrument may e.g. be a stringed instrument such as a guitar, bass guitar, etc. or non-stringed instruments. The input signal may be received from a wire connecting the musical instrument to the musical instrument tuner MIT, wireless e.g. in form of a Bluetooth signal or received by a microphone. Both wired and wireless connections may be network configurations of any suitable kind or simple direct, dedicated connections. The input signal may either be a digital signal or an analogue signal.

It should be noted that the input module IM may also facilitate upload or download of data from a computer, the internet, etc. Hence in relation hereto the input module IM may be understood as an input interface for bidirectional data communication. Such data communication may be facilitated by an USB or other universal data communication standards.

In an embodiment of the invention the input module of the musical instrument tuner MIT comprises an USB port, or alternatively a network connection, a bus connection or any other suitable communication interface, and by use of this the user is able to upload data to or from the musical instrument tuner MIT. This may facilitate updating firmware, change sensitivity, change range of frequencies to be displayed, update new program code, turn off or adjust features to obtain longer battery life, upload user defined profiles, etc.

The power supply input PSI supplies the musical instrument tuner MIT with power. Power may originate from a high voltage plug and then appropriately transformed to a low voltage determined by the components of the musical instrument tuner MIT by the power supply input PSI. Alternatively the power supply input PSI may comprise or be connectable to a battery pack e.g. a rechargeable battery pack. It should be noted that the power supply input PSI may simply be a socket for allowing connection to an external power supply.

The signal analyser SA performs calculations based on the input signal. The signal analyser SA may comprise a data processor. The data processor may e.g. be a digital signal processor, a central processing unit, a programmable gate array, or any other standard or custom processor or logic unit, and may operate based on an algorithm/algorithms depending on the type of input signal or display mode as described below. The program code and any temporary or permanent data executed and used by the data processor may be stored in suitable data storage, e.g. flash memory or RAM, from where it can be accessed by the data processor.

The user interface UI enables a user to interact with the musical instrument tuner MIT. The embodiment of the musical instrument tuner MIT illustrated on FIG. 1 is equipped with a mode selector MS. It is not essential how the user interface UI is implemented in the music instrument tuner MIT hence any suitable switches based on e.g. mechanical, optical or electrical technologies may be used.

At start up the musical instrument tuner may start up in a default session mode and if the user does not activate the mode selector before the end of the session, i.e. turning off the musical instrument tuner, the musical instrument tuner has only been analysing input signals according to the default session mode during this session. Hence the musical instrument tuner is in a single session mode from power-up to power-off and if not the user interacts with the musical instrument tuner the session mode does not change.

By activating the mode selector MS the user selects a user session mode, and thereby preferably also informs the music instrument tuner MIT about how it should interpret the input signal and how it should display the results of its analysis. By selecting user session mode and provide an input signal according to the selected session mode, the musical instrument tuner MIT may e.g. be capable of performing optimized calculations and thereby save time and energy/power compared to a fully automatic solution where the user session mode is determined automatically, and it may be capable of analysing difficult input signals better or faster than a fully automatic solution would.

There is a plurality of different user session modes which can be chosen by activating the mode selector MS. The preferred user session modes are one or more polyphonic modes and one or more monophonic modes, preferably one of each for a simple, yet powerful, embodiment.

The mode selector enables the musical instrument tuner to process an input signal differently according to the selected user session mode and/or to display its findings differently. The mode selector may be implemented as a hardware or software selector in the musical instrument tuner. Where the mode selector is solely software implemented it might typically be an automatic mode selector, e.g. a signal classifier, and where the mode selector is at least partly hardware implemented e.g. as a physical button, contact or switch, the mode selector may often be operatable by a user e.g. as a foot pedal. It should be noted that the mode selector may also be implemented so that it is activated via wireless communication technologies.

In case the musical instrument tuner is not able to determine the pitch of an input signal e.g. because the user has selected monophonic mode and strums all strings and thereby transmits a polyphonic signal to the musical instrument tuner, the musical instrument tuner may communicate e.g. a warning or error message to the user in the display or an audible warning signal.

It should be noted that a plurality of different functionalities may be facilitated by one or more multi switch MSW such as user profiles, thresholds, display modes, etc. The further functionalities may e.g. supplement the current user session mode and display mode, or they may e.g. change certain settings otherwise determined by the user session mode.

Furthermore it should be mentioned that often the display D would also be include in a reference to user interface UI.

The display D enables the music instrument tuner MIT to present information related to the input signal. The display D is preferably a display for visual presentation of information but may also be a speaker for audible presentation or motor or the like for mechanical presentation e.g. in the form of vibrations.

The housing of the musical instrument tuner may be equipped with a physical display on which information or characteristic(s) of the determined pitch(es) may be displayed according to a display mode. In this document this is sometimes referred to as displaying a pitch or tone or displaying information of a pitch and should be understood as displaying characteristic derived from the input signal such as one or more pitch frequencies. In the polyphonic display mode more than one pitch frequency may be is displayed simultaneously.

In the situation where the musical tuning device only comprises one display this display may be utilized for displaying information of a determined pitch. Alternatively the display unit of the display may be divided into display zones where one zone may display information of determined pitches in polyphonic display mode, a second display zone may display information of a specific determined pitch in monophonic display mode, a third display zone may display additional information e.g. time at the day, time estimate for tuning the strings out of tune, battery condition, reference tuning settings, instrument type information, etc.

In the situation where the display of the musical instrument tuner uses two or more display units a first display unit may be utilized for displaying information according to a polyphonic display mode and a second display unit may be utilized for displaying information of a separate pitch e.g. in a stroboscopic display mode for obtaining a higher precision of the tuning of pitch. In relation to the latter display unit this display unit could be said to display a pitch in monophonic display mode. It should be noted that these display units also may be divided into display zones.

In short the music instrument tuner may facilitate displaying all kind of information which is relevant to a user of the music instrument tuner and the user may choose the information to be displayed e.g. by using the multi switch MSW It should be noted that the musical tuner may be in a predetermined user session mode at power up. The musical instrument tuner may then facilitate for the user to be able to change this power up session mode and e.g. also be able to create user defined user session modes according to specific needs of the user.

The polyphonic display mode is optimized to display characteristics of an input signal from a music instrument received by the input module when more than one pitch frequency is comprised in the input signal and the monophonic display mode is optimized to display characteristic of an input signal from a music instrument received by the input module when only one pitch frequency is comprised in the input signal, or at least only one significant pitch frequency.

It is very advantageous to have a musical instrument tuner having both a polyphonic display mode and a monophonic display mode because it is then possible to be assisted in tuning either one string at the time or more than one string at the time assisted by the same musical instrument tuner. Furthermore a tuning of a music instrument with an appropriate amount of information according to the chosen display mode is facilitated.

It should be noted that in the monophonic display mode information or characteristics of other pitches or tones may also be displayed but just not as detailed as the characteristics of the string which is strummed by the user. In other words, a monophonic display mode can be defined as a display mode where a single pitch frequency or string is given the main consideration, whereas a polyphonic display mode can be defined as a display where at least two pitch frequencies or strings are given substantially equal consideration.

Furthermore it should be noted that in a monophonic display mode the presentation of characteristics or other information of the single pitch frequency is not limited to a specific type of display or way of presentation. Hence the physical display i.e. the display unit(s) and way of presenting information on display unit(s) may advantageously be configurable by the user, be default presentations or a combinations thereof In the same way it should be noted that in the polyphonic display mode the presentation of characteristics or other information of two or more pitch frequencies is not limited to a specific type of display or way of presentation. Hence the physical display i.e. the display unit(s) and way of presenting information on display unit(s) may advantageously be configurable by the user, there may be default presentations or combinations thereof.

In situations were only one or e.g. two strings are stroked and the user session mode is selected to be the polyphonic mode the established polyphonic characteristic may correspond to the monophonic characteristic and displayed as such.

It should be mentioned that a musical instrument tuner as described in this document may have more than one polyphonic display mode and more than one monophonic display mode.

FIG. 2 illustrates a diagram related to the use of a musical instrument tuner according to an embodiment of the invention. The diagram is illustrates the use of the musical instrument tuner from a users point of view.

It should be noted that FIG. 2 does not illustrate a flow diagram describing exactly how the musical instrument tuner actually are establishing and displaying characteristics of pitch frequencies The establishment and displaying of characteristics may be done in a plurality of different ways hence the musical instrument tuner may perform calculations on a plurality of pitch frequencies and only display one result and vice versa. Furthermore one or more pitch frequencies may be calculated and displayed in different resolutions.

The musical instrument tuner MIT is powered up in a default user session mode in step A. This default user session mode may be communicated to the user via the display D e.g. in form of a symbol or a sound.

If the user is not satisfied with the default user session mode, the user may in step B select another user session mode e.g. monophonic mode (step D), user specific mode (step E) or other modes (step N). An example of other modes could e.g. be by-pass mode where the input signal is by-passed the musical instrument tuner and thereby the input signal out of the musical instrument tuner should be exactly the same as the when the input signal enters the musical instrument tuner.

If the user is satisfied with the default user session mode e.g. polyphonic mode, the user may simply connect a musical instrument (if not done at this time) to the musical instrument tuner MIT and strum one or more strings of the musical instrument (step C).

In step F the musical instrument tuner MIT is establishing characteristics from the input signal according to the user session mode decided by the user. The input signal may e.g. originate from a guitar which strings or a single string is strummed.

In step G the musical instrument tuner MIT displays via the display D the established characteristics of the input signal to e.g. the user of the musical instrument tuner MIT. The user may then continuously observe how the string or strings are tuned according to the selected user session mode.

If the user decides during a users session mode to use another user session mode (step H), the user simply return to step B and chose another user session mode e.g. in step D, step E or step N.

When the user decides to not use the musical instrument tuner, the musical instrument tuner may be turned off in step I or the by-pass user session mode may be selected.

It should be noted that what is displayed (in step G) to the user is a representation of the established characteristics including a representation of one or more pitch frequencies from the input signal. How the established characteristics including a representation of one or more pitch frequencies is displayed depends on the type of display hence it may be representation by one or more pixels, diodes, segments, colours, sounds, etc. In the same way the corresponding predetermined target pitch frequency may also be represented depending on type of display hence it may be representation by one or more pixels, diodes, segments, colours, sounds, etc Furthermore it should be mentioned that e.g. in the monophonic mode MM the displayed characteristic including a representation of a pitch frequency may be displayed relative to e.g. a target pitch frequency e.g. as a distance from the target pitch frequency.

Display Part

Overview

The display part of the tuner consists of some display rendering means DRM to control which lights, pixels, light emitting diodes etc., should be lit, and how much.

The display rendering means is typically implemented in a microprocessor. For the actual presentation to the user some physical display means DM is used. Many suitable technologies for building displays exist, for example liquid crystal displays (LCD), light emitting diodes (LED), and organic LED (OLED).

LCD and OLED displays are often arranged as a high resolution dot-matrix, having thousands of display elements. For more cost-effective products, a custom LCD with a few hundred display elements may be used. Alternatively, a number of discrete LEDs may be used, typically from about 10 to about 100, but even as few as 1-3 diodes may be used according to a simple display embodiment of the present invention.

The display means is connected to the display rendering means typically within the same enclosure. There may however be a physical separation between the measurement and the display parts of the tuner. Alternatively there may be a separation between the display rendering means and the display means. Between the two parts the connection may be a simple cable or a network (wired or wireless), or some other suitable connection.

In a first embodiment of the invention a display mode is structured into two areas, see FIG. 3: The tuning deviation display TDD1 consists of a multitude of LEDs of which the light intensity can be individually controlled, and thus be used to display fairly detailed information. The tone name display TND1 consists of a number of LEDs arranged such that they are suitable for indicating a single letter for the tone name (A, B, C, D, E, F or G), and an optional "#" or "b". For practical reasons of illustration the unlit LEDs are indicated in the drawings as unfilled circles, whereas a lit LED is indicated by a filled circle. Intermediate light intensity levels are indicated as a hashed pattern. In another display technology, such as LCD, the interpretation of filled and unfilled could be different.

The TDD1 is preferably used also for presentation in textual form of information regarding the settings of the tuning device. Such settings may include the frequency of the reference tone A, normally 440 Hz, but settable to slightly deviating values such as between 435 and 445 Hz.

FIG. 4 shows the display of the tuner in monophonic mode with a perfectly tuned E as input. The vertical line of lit LEDs is similar in concept as the needle in an analog meter, such that a positive or negative deviation from the target tuning is indicated by lightning the LEDs to the right or left of the centerline. This is seen in FIG. 5 which shows the display of the tuner in monophonic mode with a slightly flat tuned E as input. It is possible to indicate very small changes in the tuning deviation by controlling the intensity of two neighbor LEDs, such that the "needle" appears to be placed at intermediate positions between the actual positions of the LEDs. Such techniques are well-known in the art.

Due to the large sensitivity of the eye to angular movements, compared to linear movements, it is advantageous to arrange display contents or elements in such a way that the tuning indicator "needle" (pattern of active display elements) changes its angle as well as position when the frequency deviation changes.

If a polyphonic signal is input to the tuning device the display changes appearance in order to be better suited for indicating the result of the polyphonic pitch measurement. FIG. 6 shows the display of the tuner in polyphonic mode indicating that the tuning of all six strings are in tune. The area of the tuning deviation display TDD1 is now used to display six pairs of LEDs within the sub-areas PTI1, PTI2, PTI3, PTI4, PTI5, and PTI6. A positive or negative deviation from the target tuning is indicated by the lightning LEDs above or below the center row. The tone name display is typically blank in case of polyphonic input.

Figure 1:
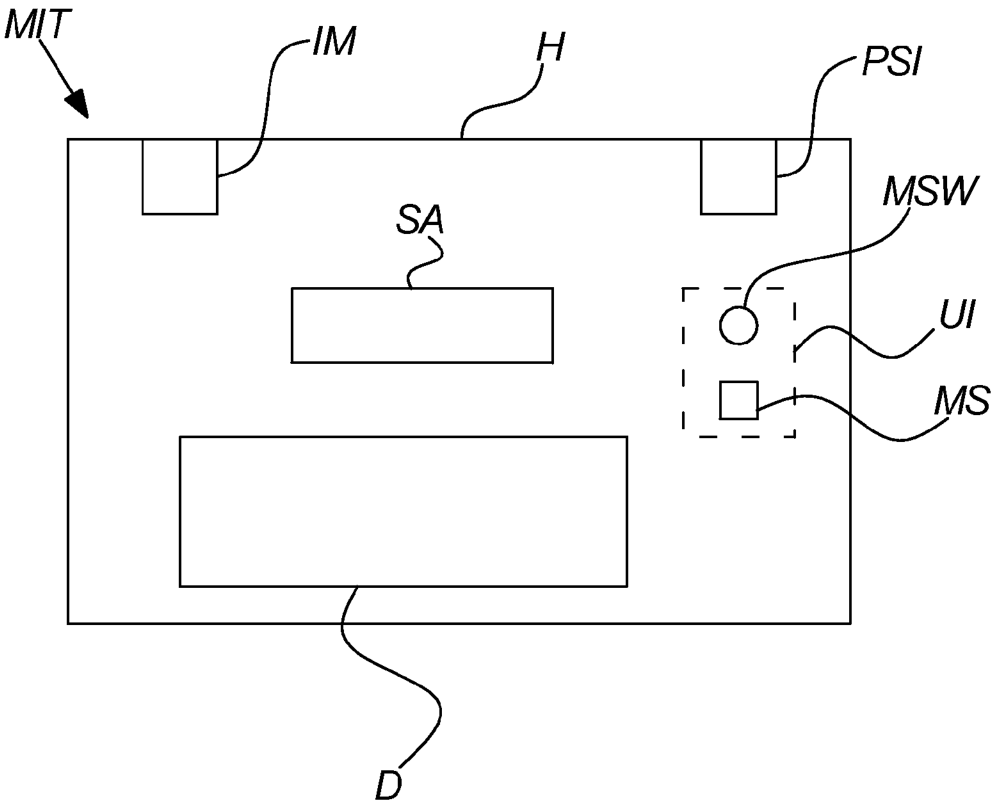
Figure 2:
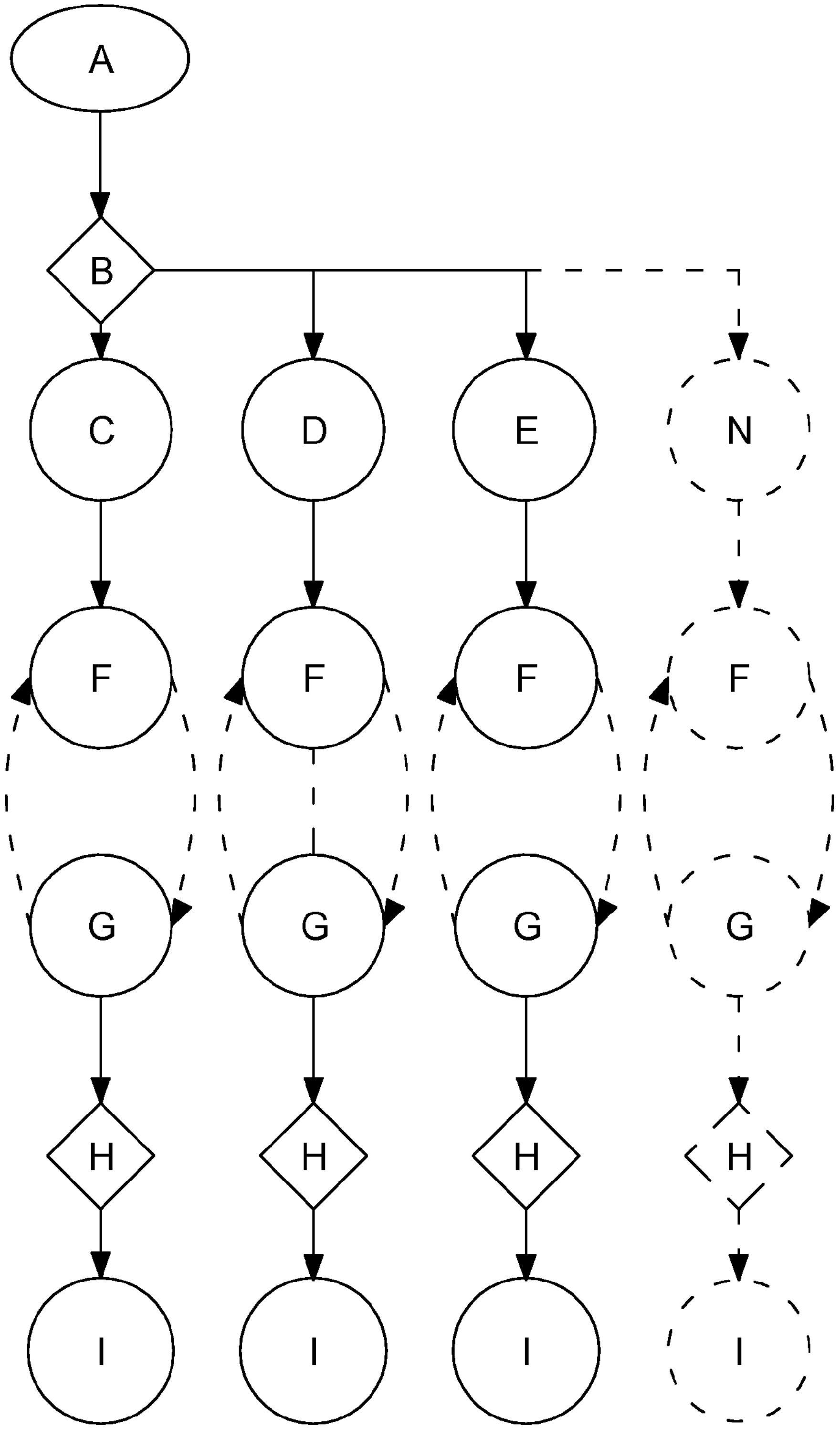
Figure 3:
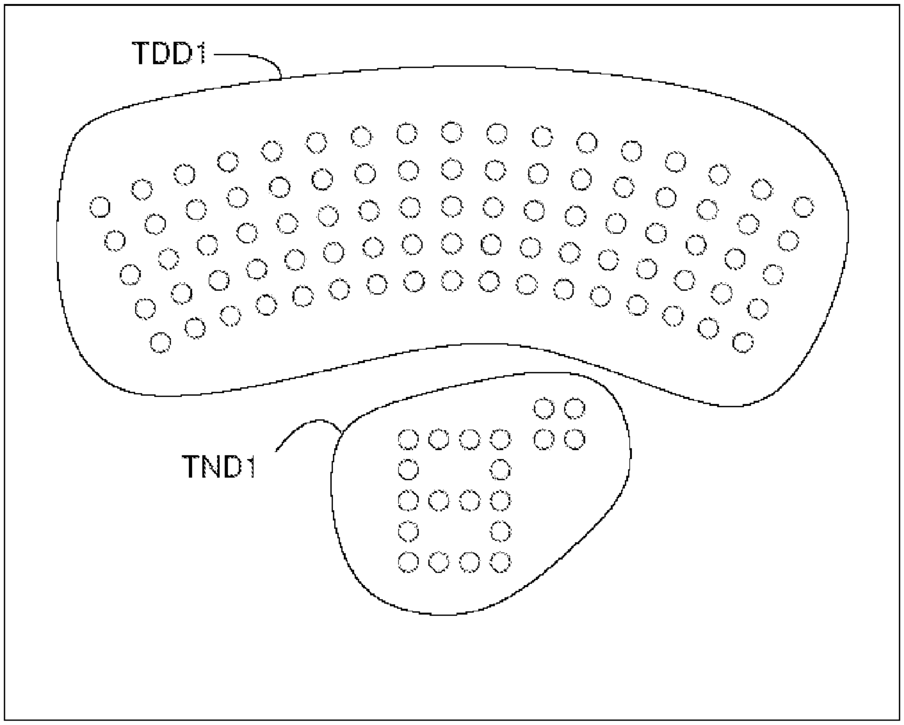
Figure 4:
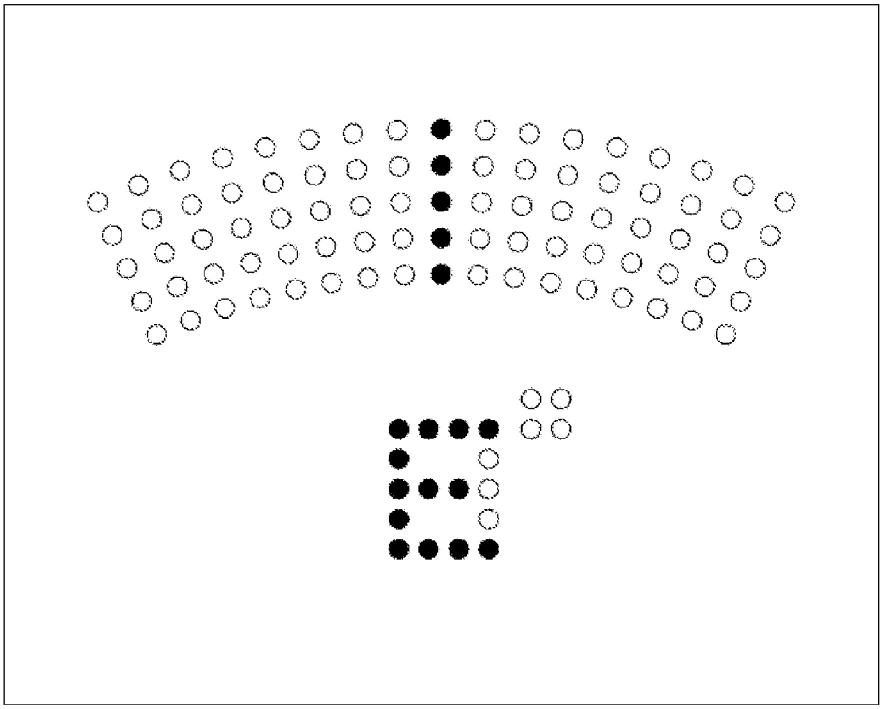
Figure 5:
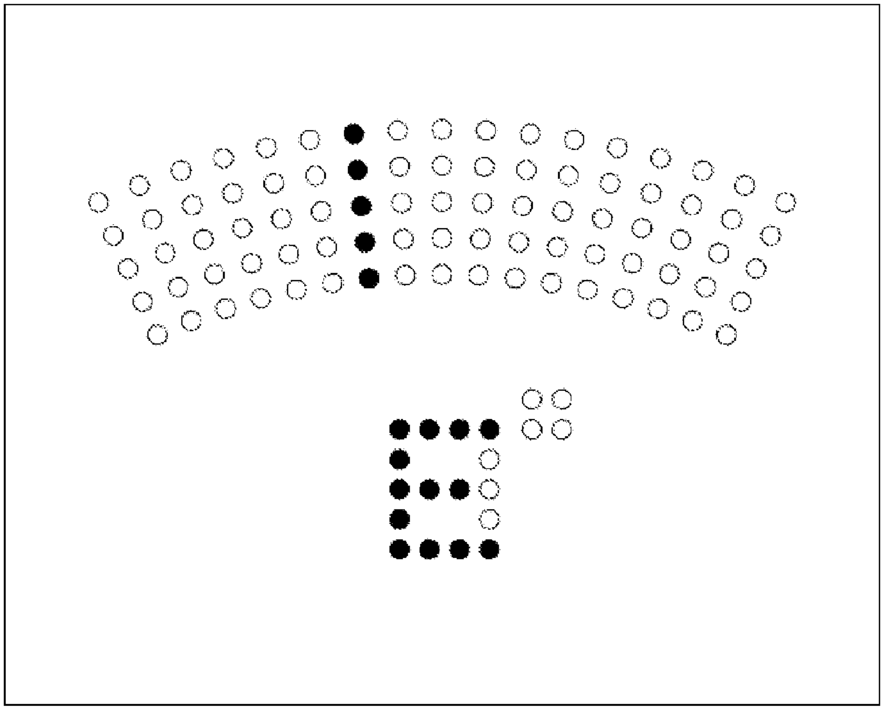
Figure 6:
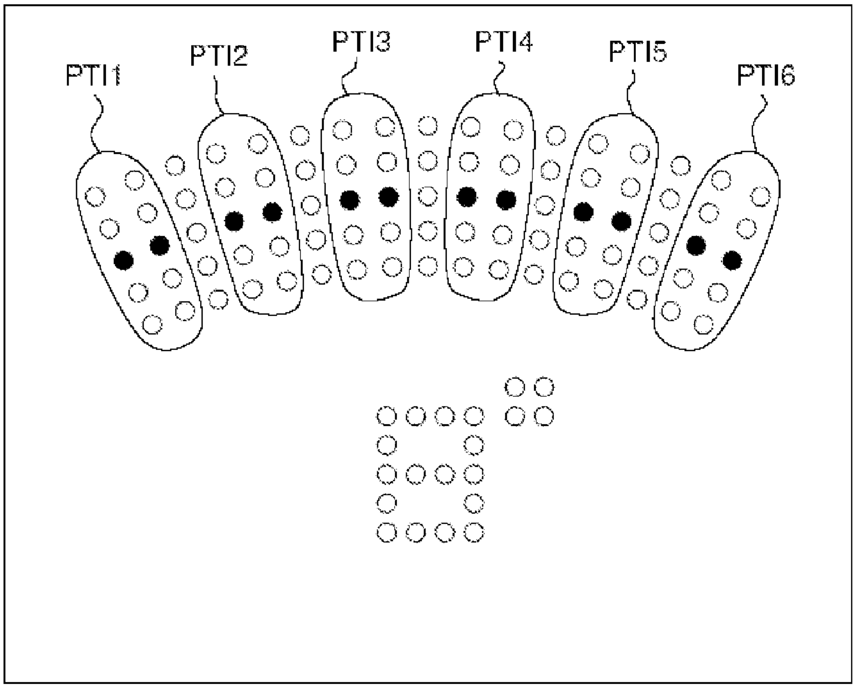
Figure 7:
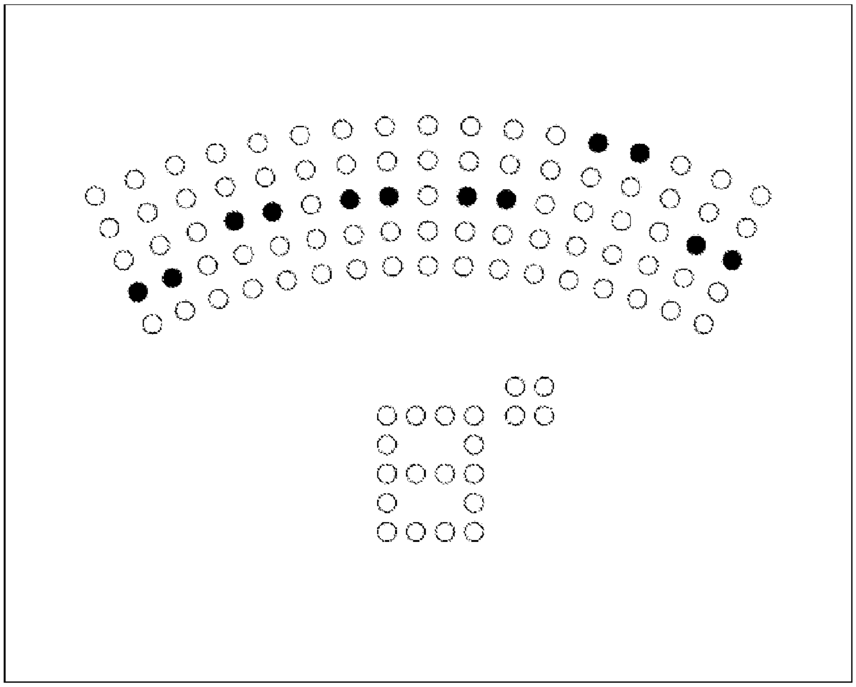
FIG. 7 shows the display of the tuner in polyphonic mode indicating tuning of all six strings with the low E string being slightly flat (the leftmost pair of LEDs), the B string being significantly sharp (the fifth pair of LEDs counting from the left), and the four other strings being in tune.
Figure 10:
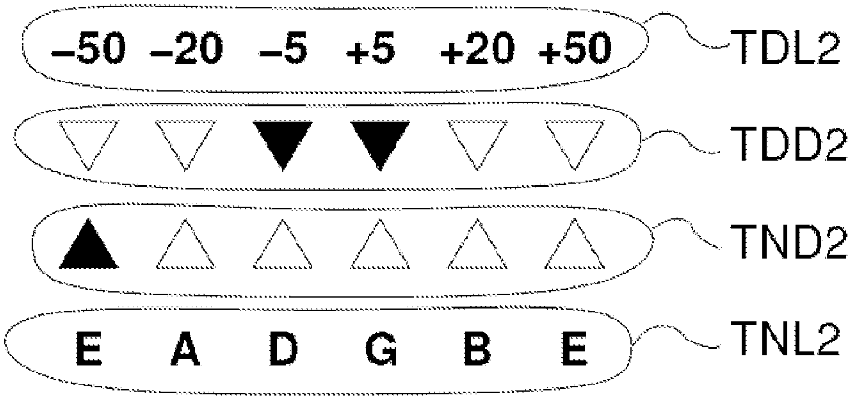

If for reasons of cost or space a display mode configuration like in FIG. 3 is not practicable, a simpler display mode configuration carrying the same information may be used. FIG. 10 shows such an embodiment of a simpler tuner display in monophonic mode indicating that the low E string is played, and that it is in tune. Two rows of LEDs or similar indicators are provided: The tuning deviation display TDD2 indicates the monophonic tuning deviation in a similar fashion as in FIGS. 4 and 5. In this particular case the method to indicate a zero deviation is that the two middle LEDs are both fully lit. The tone name display TND2 consists of six LEDs, one for each string of the guitar. The LED corresponding to the string being closest in pitch to the incoming signal is lit. Two label fields may be printed close to the display. The tuning deviation labels TDL2 indicate how many musical cents of tuning deviation each of the LEDs in the TDD2 correspond to. The tone name labels TNL2 indicate the name of the string corresponding to each of the LEDs above the label.

Figure 11:
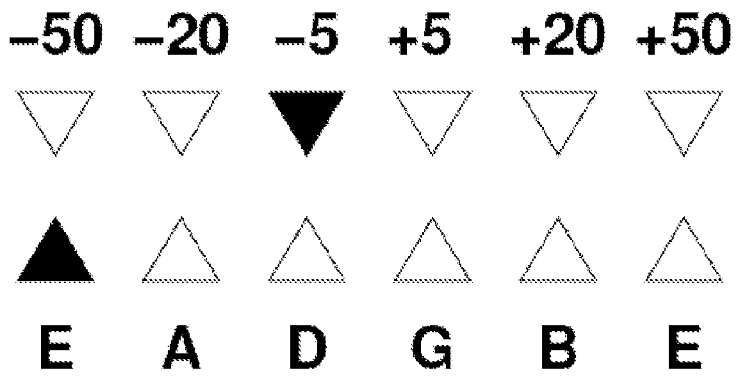

A small tuning deviation may be rendered as in FIG. 11, which shows a simpler tuner display in monophonic mode indicating that the low E string is played, and that it is tuned slightly flat.

Figure 12:
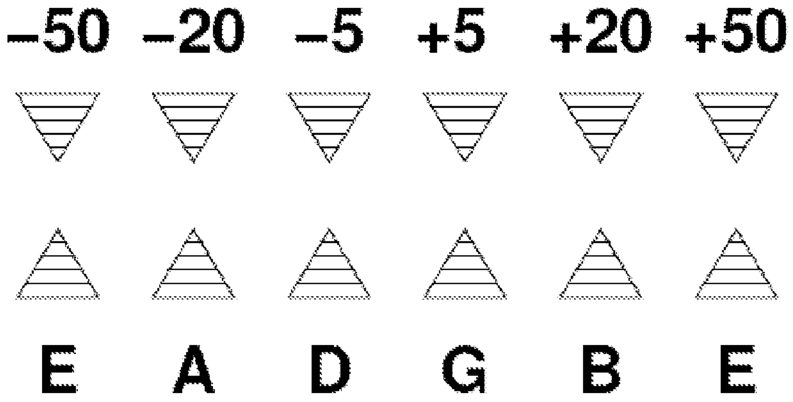

If a polyphonic signal is input to the tuning device also the simpler display changes appearance in order to be better suited for indicating the result of the polyphonic pitch measurement. FIG. 12 shows a simpler tuner display in polyphonic mode indicating that all strings are being played, and they are all in tune. For each string a pair of LEDs indicates the tuning deviation by varying the intensity of the two LEDs appropriately. If a string is tuned correctly the corresponding pair of LEDs may possibly be lit in another colour in order to emphasise the correct tuning.

Figure 13:
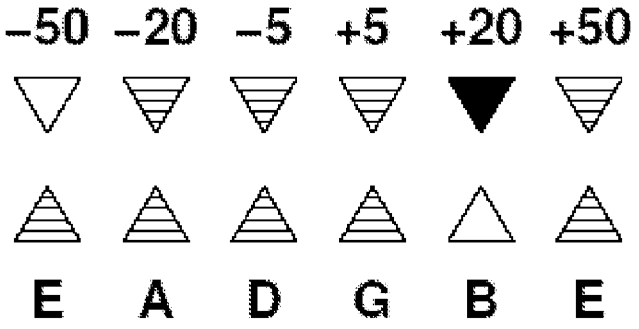

FIG. 13 shows a simpler tuner display in polyphonic mode indicating that all strings are being played, and that the low E string is tuned slightly flat, and that the B string is tuned significantly sharp.

Figure 14:
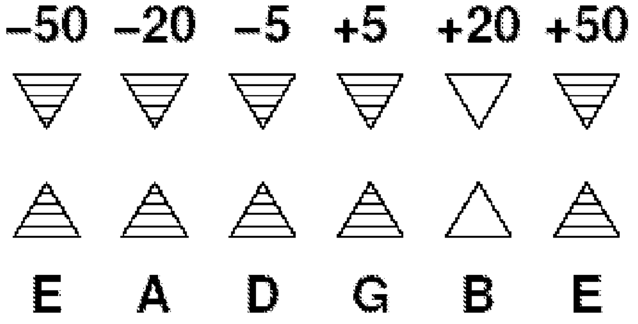

One way of indicating that a string is not being played is to blank the indicator for that particular string. This is illustrated in FIG. 14, which shows a simpler tuner display in polyphonic mode indicating that five of the six strings are being played, and they are in tune.

Figure 15:
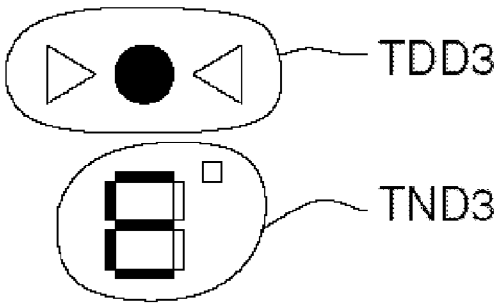

An alternative embodiment of a simple display mode configuration is shown in FIG. 15, which shows a very simple tuner display in monophonic mode indicating that an E string is played, and that it is in tune. Similarly to the two other examples of embodiments the display consists of a tuning deviation display TDD3 and a tone name display TND3. In this particular case the round center LED indicates that the tuning is correct. This LED is preferable of another colour as the two outer LEDs.

Figure 16:
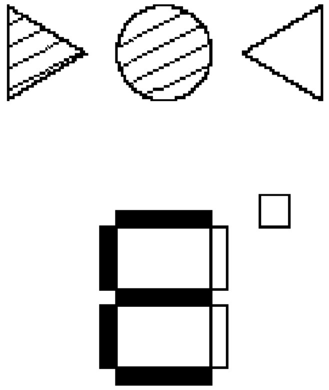

FIG. 16 shows a very simple tuner display in monophonic mode indicating that an E string is played, and that it is tuned slightly flat.

Figure 17:
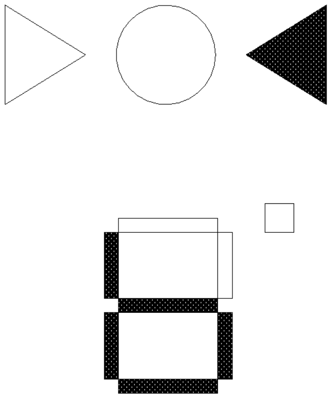

FIG. 17 shows a very simple tuner display in monophonic mode indicating that a B string is played, and that it is tuned significantly sharp.

Figure 18:
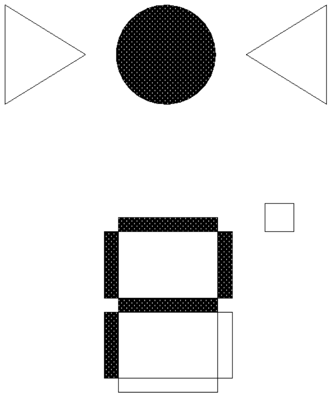

Due to the limitations of the very simple tuner display the pitch measurement results for all six strings cannot be displayed simultaneously. In the case where all six strings are in tune it is simple to display. FIG. 18 shows a very simple tuner display in polyphonic mode indicating that all strings are played, and they are all in tune. The "P" in the tone name display indicates that the input is polyphonic.

In case one or more strings are out of tune the very simple tuner display may show the name and deviation of that string which is in the strongest need of correction. When that string has been tuned into place the next string in need of tuning correction (if any) is displayed.

Figure 19:
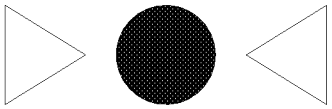

FIG. 19 shows an even simpler tuner display using only 3 LEDs in polyphonic mode to indicate that all strings are played and that they are all in tune, or alternatively that one or more strings are mistuned. An alternative, yet simpler display uses e.g. one simple light emitting diode, which only lights up when all one or more played strings are in tune, or alternatively employs a blinking scheme or a multicolor LED to indicate the state of the strings.

Sensible display information for most types of input

It is an object of the present invention that the display, whether complex or simple, shows sensible and usable information for most types of input signal.

In particular, when the input signal is monophonic, the display DM shows the tone name (chroma) which most closely corresponds to the pitch of the input signal, and a measurement of the accuracy of the tuning is presented.

Alternatively, when an input signal consists of the signal from two or more strings, the display will indicate whether the input frequencies correspond to the desired values, and if not, the magnitude and direction of the deviation.

In the case that all of the expected input frequencies for six strings are present and in tune the display may present an extra indication, e.g. by turning on a green indicator. On the other hand, if one or more of the input frequencies are out of tune, even a very simple display can indicate the name of the note corresponding to the string which is mistuned by the largest amount, and the direction and possibly the degree of the frequency deviation.

Automatic change of display mode for monophonic and polyphonic input

It is an object of the present invention that it is easy and fast to use, and at the same time reliable in its measurements and display. Due to the constraints often present in real devices, a limited display will be available, and the challenge is to make the best use of it. The ability to change between different renderings for monophonic and polyphonic input signals is a very important aspect of utilising the display in an efficient way. Another aspect is of more practical nature, namely that the rendering mode, and possibly the measurement mode, changes automatically depending on the type of input. If the user needs to press a footswitch or similar to change between modes, when playing a single string or all of them, chances are that this switch will be in the wrong position so often that the availability of two measurement and display modes will tend to be more disturbing than helpful.

Nevertheless it might still be advantageous to be able to manually switch display mode, resolution of the display, physical display means such as displays based on different technologies or different location, etc. Being able to switch manually enables the musician to choose to get a specific information displayed or information of current importance displayed. This could be displayed instead of other information, together with other information on the same display or at further display.

A particularly advantageous embodiment of the invention therefore comprises means to change display mode automatically depending on whether the input signal consist of the signal from a single string or from two or more strings.

Automatic change between guitar and bass in polyphonic mode

As described below, the differences between guitars and bass guitars makes it desirable to be able to distinguish between the two for pitch detection purposes.

As the four middle strings of a six-string bass guitar as described below correspond to the four lowest strings on a guitar, but one octave lower, different labelling on the display for the polyphonic tuner may therefore be needed. In an embodiment of the present invention, this display change is made automatically, based on the characteristics of the measured input signal as described above.

A particularly advantageous embodiment of the invention therefore comprises means to change detection and display mode automatically depending on whether the input signal consist of the signal from a guitar or from a bass.

Alternative Measurement and Display Mode

Figure 8:
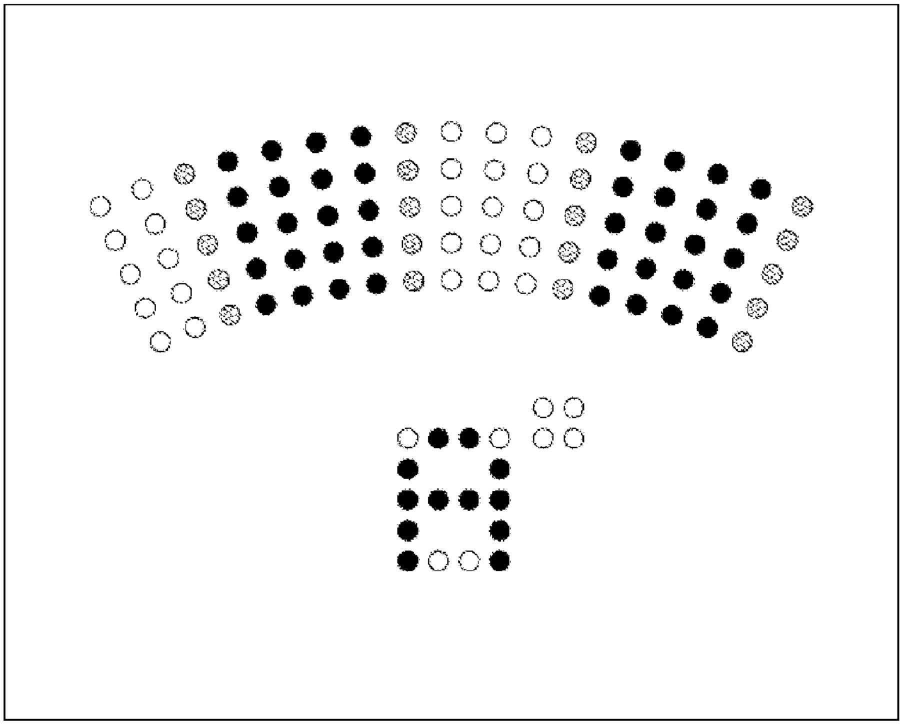
FIG. 8 shows an alternative, stroboscopic, display in monophonic mode, in which the movement to the left or right of a pattern of dots indicates how accurately the input (an A in this case) is tuned.

In addition to said needle mode, a stroboscopic measurement and indication mode is advantageous, especially when the display mode changes automatically between polyphonic (needle-type) mode and monophonic strobe mode. The stroboscopic mode is very well suited to perform fine adjustments to the tuning of the instrument, whereas the needle mode is typically better suited for a quick indication of the state of the tuning—either in monophonic or polyphonic mode. FIG. 8 shows a possible rendering of the stroboscopic display.

The stroboscopic measurement mode in the present invention emulates in the digital domain the classic technique described in U.S. Pat. No. 2,806,953 by Krauss and U.S. Pat. No. 3,952,625 by Peterson, which use a rotating disc together with a flashing light to tune a musical instrument. Also in U.S. Pat. No. 4,589,324 by Aronstein and in U.S. Pat. No. 5,777,248 by Campbell are described tuners based on the stroboscopic principle. All of these are hereby incorporated by reference.

Whether the stroboscopic tuner is implemented using electro-mechanical or digital means, the principle of indication is the same: When the input signal has a pitch frequency corresponding to the target pitch frequency the pattern on the disc or on the display appears to be stationary. If the pitch frequency of the input signal is below the target pitch frequency, the pattern appears to rotate in one direction, and if the pitch frequency is above the target pitch frequency the pattern appears to rotate in the opposite direction.

The digital implementation of the stroboscopic principle in the present invention consists of an input signal buffer and an interpolation means. The input buffer contains at least one, but preferably at least two, periods of the input signal, and is updated in real time with new input.

The interpolation means is synchronised to a target pitch frequency. This target frequency corresponds to the semitone closest to the pitch frequency. The monophonic tuner described above is used to determine the target pitch frequency. A number of samples corresponding to the number of display elements used for the stroboscopic display is sampled from the input buffer, at equally spaced time instances, such that one or two periods of the target pitch frequency can be represented by the samples.

In FIG. 8 the number of display elements, in the relevant direction, for stroboscopic display is 17. If the pitch frequency is equal to the target pitch frequency, the pattern appears to be steady. Depending on the phase of the input signal the pattern of light and dark may be shifted to the left or to the right, but still being steady.

If the pitch frequency of the input signal is below the target pitch frequency, the pattern appears to move to the left (or right), and if the pitch frequency is above the target pitch frequency the pattern appears to move in the opposite direction. The speed of the movement is proportional to the frequency deviation between the pitch frequency and the target pitch frequency. With a stroboscopic tuner as in the present invention it is possible to see very small frequency deviations in real time, and it is therefore a very good tuning aid.

In the display rendering means light intensity is used in this way for the stroboscopic display mode: Bright for positive instantaneous input signal value and dim for negative instantaneous input signal value, or vice versa.

A particularly advantageous embodiment of the invention comprises a stroboscopic measurement and display mode.

Another Alternative Display Mode

Figure 9:
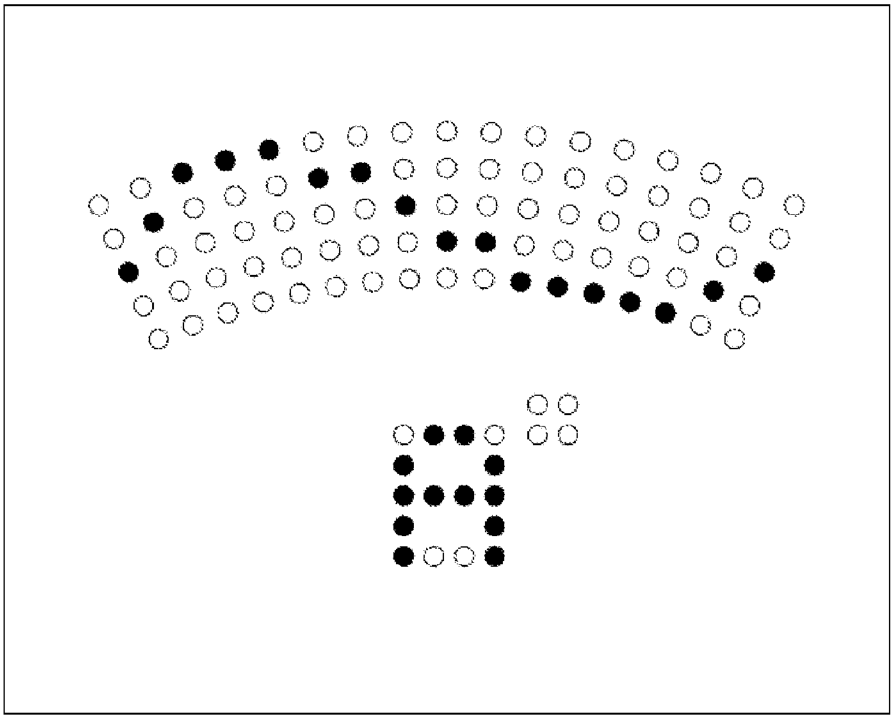
FIG. 9 shows an alternative, waveform, display in monophonic mode, in which the movement to the left or right of a waveform-pattern of dots indicates how accurately the input (A in this case) is tuned.

The same underlying mechanism which is used in the stroboscopic tuner can be used for a synchronised display of the input waveform, see FIG. 9. This display mode is essentially the same as an oscilloscope where the trigger of the horizontal (X) movement of the beam is controlled by the target pitch frequency, and the deviation in the vertical direction (Y) is controlled by the input waveform/voltage.

The target pitch frequency is, similarly as in the stroboscopic tuner, the semitone frequency being closest to the pitch frequency.

Figure 20:
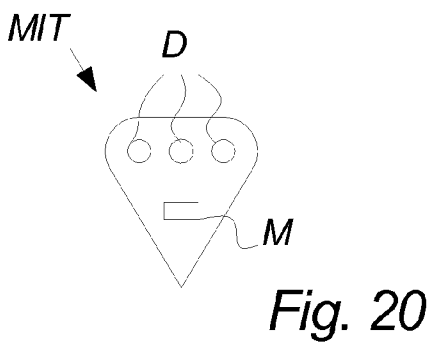

FIG. 20 illustrates an embodiment of the invention where the musical instrument tuner MIT is very simple and small in size and may be referred to as a pocket tuner, clip-on tuner etc. The musical instrument tuner MIT in this embodiment only comprises 3 light emitting diodes D used to indicate if an input signal is tuned or not. The input module is in this embodiment comprising a microphone M.

The three diodes may e.g. in a monophonic mode indicate flat, tuned and sharp, respectively, and in a polyphonic mode all light up in green if all the strummed strings are tuned, otherwise light up in red to indicate that one or more strings are off, possibly with the number of red diodes indicating how far off. Thereby the monophonic characteristics and polyphonic characteristics can be displayed with different resolution. Several other ways of arranging both monophonic and polyphonic display modes by using a small number of diodes, e.g. 1-3, are suitable and within the scope of the present invention, as e.g. indicated above with reference to FIGS. 15-19.

A musical instrument tuner MIT as illustrated in FIG. 20 may facilitate releasable mounting on e.g. a guitar by use of a not illustrated fastening module e.g. comprising a clamp, suction disk, etc. The fastening module may e.g. be located at the opposite side of the musical instrument tuner MIT than the light emitting diodes or in relation to the edge of the musical instrument tuner MIT.

For musical instrument tuner MIT embodiments that are small in size e.g. as small as the size of a plectrum, the accuracy, precision, display, calculation speed, number of algorithms, etc. may be decreased. The decrease in performance may e.g. be related to small data processors or the wish to reduce power consumption to extend battery life.

The musical instrument tuner MIT illustrated on FIG. 20 may facilitate being mounted on a musical instrument. The musical instrument tuner may be mounted by use of a magnet, clamp, vacuum, etc. Further, a musical instrument tuner according to the present invention may be provided for integration in existing guitars or other instruments, or for guitar manufacturers to build into new guitars, etc.

It should be mentioned that if the musical instrument tuner MIT is attached to the instrument, e.g. as a clip-on model or a built-in model, the musical instrument tuner MIT may comprise a motion sensor of any kind which may be used to detect if the guitar is in use and thereby determine if the musical instrument tuner should be put in standby to save energy.

In case the musical instrument tuner MIT is so small in size that it is not physically possible to implement a plug, the input module IM may be e.g. a microphone or a vibration detector, e.g. an accelerometer, for detecting signals from the instrument tuner, either through the air or via the instrument components.

The display D of such small musical instrument tuner MIT (or the other embodiments of musical instrument MIT tuners as described in this document) may be limited to one or more pixels or light emitting diodes, etc. depending on the desired display form. When only e.g. one diode is used this diode may use different colours, blinking, etc. to indicate mode of the input signal, if one or more strings are tuned, etc.

In the situation where the display D only comprises one diode, the musical instrument tuner may interpret an input signal e.g. from a guitar where all strings are strummed as a polyphonic input signal and by means of the one diode communicate whether or not the strings are sufficiently tuned. If the strings are not sufficiently tuned the musician may need to tune one string at the time and between tuning the individual strings, strum all strings to see if the result of the tuning is satisfying.

Similar when only one string is strummed, the musical instrument tuner MIT may interpret the input signal e.g. from a guitar as a monophonic input signal and by means of the one diode communicate whether or not the strummed string is sufficiently tuned.

Figure 21:
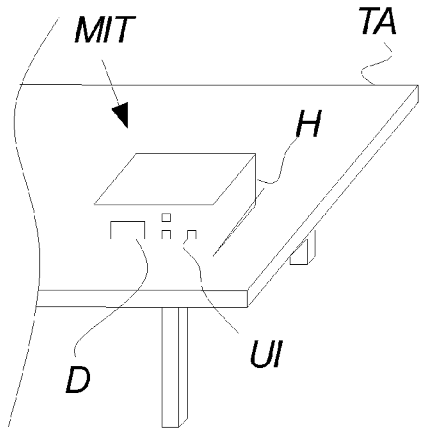

FIG. 21 illustrates an embodiment of the invention where the tuner T is implemented as a standalone table-top device here illustrated located on a table TA. The tuner T in this embodiment comprises a housing H, a display D and a user interface UI. Musical instrument tuners MIT of this kind may typically comprise an input module with a plug for connecting an electric or semi-acoustic guitar and also comprising a microphone for picking up audio from acoustic instruments. In a further embodiment, the input module may comprise a wireless receiver that receives a signal representative of the audio established by the instrument, e.g. by attaching a clip-on module comprising a microphone or suitable vibration sensor and a wireless transmitter to the instrument. The wireless transmitter module may alternatively or in addition thereto comprise a jack for plugging into electric instrument's signal out port.

Figure 22:
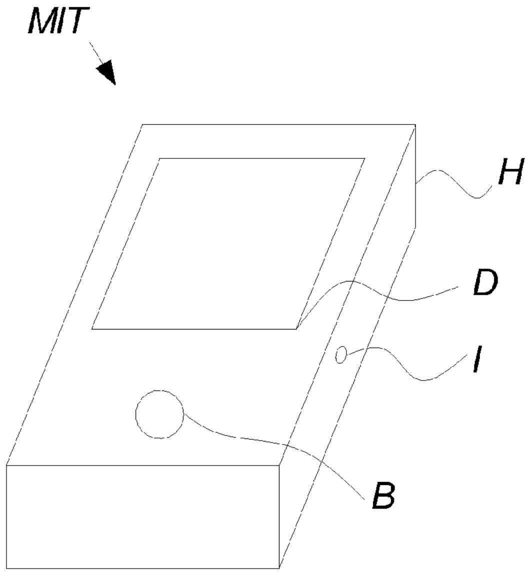

FIG. 22 illustrates an embodiment of the invention where the tuner T is implemented as a standalone device here illustrated as a foot pedal. The tuner T in this embodiment comprises a housing H, display D, bypass switch B, signal interface I.

Figure 23:
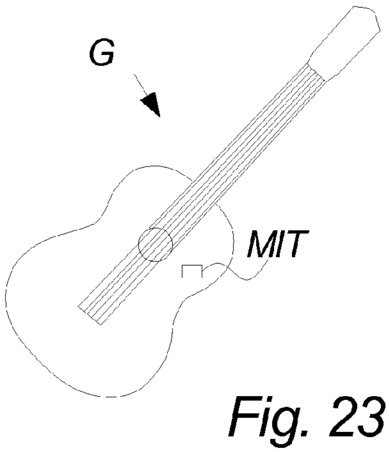

FIG. 23 illustrates an embodiment of the invention where the tuner T is implemented in a guitar G.

It should be remembered that the embodiments illustrated in FIGS. 20 to 23 may comprise some or all the functionalities and features describes elsewhere in this document.

Block Diagram of the Tuner

Figure 24:
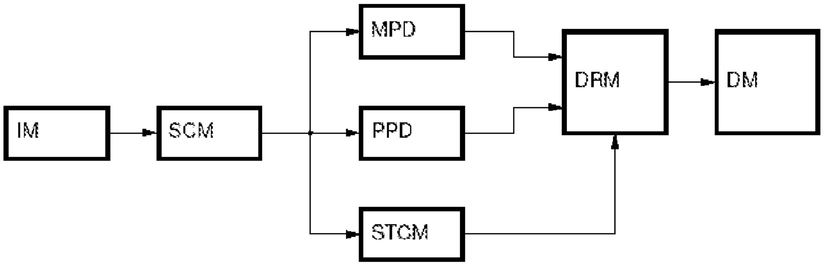

Refer to FIG. 24 for a block diagram for a preferred embodiment of the invention. The audio signal from the musical instrument is fed to the tuner through some input means IM which may be a microphone, a magnetic transducer, or a suitable socket for cable connection—or other suitable means. From the input means IM the signal is fed to some input conditioning means SCM which may consist of amplification, filtering, e.g. hum filtering, and analog to digital conversion. The conditioned input signal is fed to three functional units: A monophonic pitch detector MPD, a polyphonic pitch detector PPD and some signal type classification means STCM.

The monophonic pitch detector MPD determines, if possible, the pitch period of the input signal and presents the determined period, frequency, or deviation from a target pitch frequency, on the output of the block. The target pitch frequency corresponds to the semitone closest to the determined pitch frequency, and is preferably determined by the monophonic pitch detector. If the input signal is not monophonic in nature the MPD may still deliver a result but it may not be a valid pitch period.

The polyphonic pitch detector PPD determines the pitch period of up to six partials which are present in the input signal simultaneously. These six partials are selected such that they can be used to selectively determine the pitch period for each of the six strings of the guitar. The polyphonic pitch detector PPD presents on its output the determined pitch period times, frequencies, or deviations from target frequencies or period times. The number of partials is preferably chosen according to the type of instruments the tuner is intended for, e.g. 6 partials for guitar type instruments with no more than 6 strings. Evidently, embodiments with other numbers of partials suitable for other instrument types are within the scope of the present invention.

The signal type classification means analyses the character of the input signal to identify whether it is of monophonic or polyphonic nature. If the input signal is of monophonic nature the display rendering means DRM renders the single determined pitch deviation in such a way that it is easy to read and has a high accuracy. If the input signal is polyphonic in nature the display rendering means DRM renders the multiple determined pitch deviations in such a way that a good overview of the tuning accuracy of all strings is achieved. The rendered pattern of display information is presented physically by the display means DM. If the input signal is neither a valid monophonic signal nor a valid polyphonic signal, for example white noise, the DRM will render a suitable indication, which may be to blank the display, or show the word "error", or similar.

Sometimes the signal type classification means is also referred to as signal mode selector.

In some embodiments of the invention a signal mode selector may either be located as part of the input conditioning means, as part of the functional units preferably as part of the signal type classification means or as part of the display rendering means. The signal mode selector may be implemented either as an automatic selector such as a signal classifier or as a manually operatable switch such as a mode selector MS.

It should be noted that in a very simple form the mode selector or signal classifier may be implemented as a monophonic tuner, which when receiving a polyphonic input signal, outputs an indication of an error or simply blank—no output, which subsequent algorithms interpret as the existence of a polyphonic input signal.

Furthermore it should be noted that even the user may function as a mode selector or signal classifier by, in manual embodiments, choosing the desired mode or, in automatic embodiments, strum one string when monophonic mode is desired and more than one string when polyphonic mode is desired.

In some embodiments of the invention the functional blocks in the block diagram may be arranged in a different way, such that for example one block implements two or more of the tasks described. It is also possible in some embodiments of the invention that the functional blocks are connected in another sequence as long as the overall function is maintained.

The tuner is provided with power from a power supply input (not illustrated), which may be a battery or connectors connecting a battery to the musical instrument tuner, a socket adapted to a plug from an external power supply, a motion sensor or solar panel converting movements or light, respectively, to energy, etc.

The tuner may receive input via an input module or input interface enabling bidirectional data communication. Such data communication may be facilitated by an USB or other universal data communication standards.

In an embodiment of the invention the input module of the musical instrument tuner MIT comprises an USB port, or alternatively a network connection, a bus connection or any other suitable communication interface, and by use of this the user is able to upload data to or from the musical instrument tuner MIT. This may facilitate updating firmware, change sensitivity, change range of frequencies to be displayed, update software, turn off or adjust features to obtain longer battery life, upload user defined profiles, etc.

Detection Part

Monophonic Pitch Detection

The basic pitch determining function which all tuners must provide is the monophonic mode. It is typically used when a new string is mounted, and when a wide range and/or a high precision adjustment is required. In a preferred embodiment of the present invention the monophonic pitch detector has a wide frequency range, in the order of 7 octaves, such that it is able to determine pitch frequencies of all common musical instruments without changing settings. Several methods for determining the pitch frequency of a monophonic signal exist, such as for example:

zero crossing rate (time domain),
bit-wise correlation (time domain),
phase-locked loop (time domain),
Fourier transform (frequency domain),
cepstral analysis (time and frequency domain),
Autocorrelation (time domain),
ASDF (average square difference function) (time domain),
AMDF (average magnitude difference function) (time domain).

The choice of method depends on both its accuracy, robustness and computational complexity. Furthermore, when choosing a pitch detection method it must be taken into account that different platforms, such as logic circuits, microprocessors and signal processors, exhibit different strengths and weaknesses, and that the optimum choice is therefore very dependent on the platform.

Some of the time domain methods are very simple and based on a binary sequence representing basically just the sign of the signal, two levels. Such methods can be implemented using simple circuits. The most simple is probably to determine the time distance between sign changes, equivalent to the zero crossing rate. A more advanced and robust binary time domain method is described in U.S. Pat. No. 4,429,609 by Warrender, in which a method of determining correlation between direct and delayed binary representations of input is used, hereby incorporated by reference.

Having a more precise signal representation, using more than two levels, enables the use of the more precise autocorrelation and average difference functions. A more capable computational platform is needed for these than for the methods using the binary sequence.

The frequency-domain methods such as the Fourier transform are also capable of very precise determination, at the cost of a relatively high computational complexity.

Any of these or any other pitch detection methods can be used as basic pitch frequency determining method in the present invention.

In a preferred embodiment of the present invention the ASDF function is used for mono-phonic pitch frequency determination.

Polyphonic Pitch Detection

Determining individual pitch frequencies in a complex audio signal can be challenging, and sometimes it is not possible to distinguish signals from different strings due to overlapping spectral contents. The standard tuning of a six-string guitar does allow an individual measurement of the six strings to be made, however, as also demonstrated in U.S. Pat. No. 6,066,790. Using the fundamental frequencies of the six strings is not necessarily the optimum choice due to the coincidence of harmonic partials from different strings. It must be remembered that for example on an electric guitar the fundamental is not necessarily the strongest partial in the signal from a string. The levels of the individual partials are very much dependent on the distance from the bridge to the magnetic pick-up.

One method to separate the partials from the six strings is to use a set of bandpass filters, one for each string, followed by a set of monophonic pitch detectors, such as described in the previous section. The center frequencies of the bandpass filters will be tuned to the desired target pitch frequencies of the strings, e.g. 5 or 4 semitones apart for a standard guitar tuning.

Another method for determining the frequencies of the individual partials is to use a Fourier transform on the, preferably conditioned, input signal containing all of the partials for all strings simultaneously. A single Fourier transform can then be used to find the desired pitch information for all six strings.

In a preferred embodiment of the present invention the polyphonic pitch detection consists of a set of bandpass filters followed by a set of monophonic pitch detectors.

Having a polyphonic pitch detector and corresponding display with a simultaneous overview of all strings available makes it much easier for the user to compensate for the soft neck of many guitars and to tune floating bridge guitars, such that the undesired interaction between the tuning of the individual strings is less disturbing.

Regardless of which method is used to separate the signals from the individual strings, a limitation is inherent in the polyphonic pitch detection: As the polyphonic pitch detector has no way of knowing whether a set of harmonic partials of some fundamental frequency belongs to one string or another, it must assume that a certain frequency range around the nominal frequency of each string belongs to that particular string. It is thus possible, when a string is very much out of tune, that the measurement result is shown in the tuning indicator for the wrong string. For this reason it is important to have a wide frequency range monophonic tuner readily available in addition to the polyphonic tuner.

Distinguishing Between Input Signals of Monophonic and Polyphonic Nature

In practical use, the most appropriate operating and display mode of the tuning device changes between polyphonic and monophonic mode. This change is motivated by automatic detection of the different strengths of the two modes.

Alternatively the change can be made manually e.g. by activating a switch on the tuning device, musical instrument, foot pedal, wire, etc.

Having to change mode manually, such as by pressing a footswitch, is inconvenient, however, as experience shows that in equipment with several operating modes, the one wanted is very often not the one currently set. It is therefore desirable that the tuner automatically senses the nature of the input signal and changes operating and display modes accordingly.

The nature of the input signal may in the context of the present invention be either monophonic (for a single string played) or polyphonic (when two or more strings are played). An advantageous part of the present invention is a classification means which senses whether the signal is monophonic or polyphonic.

In far most situations information to be displayed is determined automatic by the classification means. But situations might occur where it would be advantageous for the musician to overrule the automatic selected information and be able to perform a manually selection of information to be displayed. Such situation could occur when a musician plays two or more strings and the classification means senses and displays the tones in polyphonic mode. From this overview of e.g. six strings maybe only one string is out of tune or maybe the musician want to check one specific string in more details. In this situation it would be advantageous for the musician to be able to manually change the displayed information to get information of the specific string displayed. In case only one string is played it is still possible for the musician to choose to display that string manually, but often it might be preferred that the tuning device automatically takes that decision.

The information of the specific string may be displayed by means of the available display means. In the situation where the tuning device only comprises one display this display may be utilized for displaying the information of the specific string. Alternatively the display may be divided in sections where one section may continue to display information of more than one string in polyphonic mode, a second section may display a separate sting, a third section may display additional information, etc.

In the situation where the tuning device uses two or more physical displays a first display may be utilized for displaying the polyphonic mode and a second display may be utilized for displaying the separate sting e.g. in a stroboscopic mode for obtaining a higher precision of the tone.

Due to the fact that tuning one string influences the tuning of all other strings it might be advantageous according to an embodiment of the invention to have a tuning device with a display for each string and e.g. also displays for additional information. This embodiment would be very useful in the situation where it is important that all strings are exactly correctly tuned. Such exactly correct tuning could be obtained by having a display or display section for each string e.g. displaying the tune of the sting in a stroboscopic mode.

In addition to monophonic and polyphonic input signals, a third and fourth condition exist: If no input signal is present the tuning device should also have a well-defined behaviour, e.g. set the display appropriately, e.g. blank it. If on the other hand a signal is present but of a noisy character without distinct pitches, the tuning devices should also have a well-defined behaviour, e.g. by letting the display indicate that the input is invalid, e.g. by writing "error", or blank the display.

Figure 25:
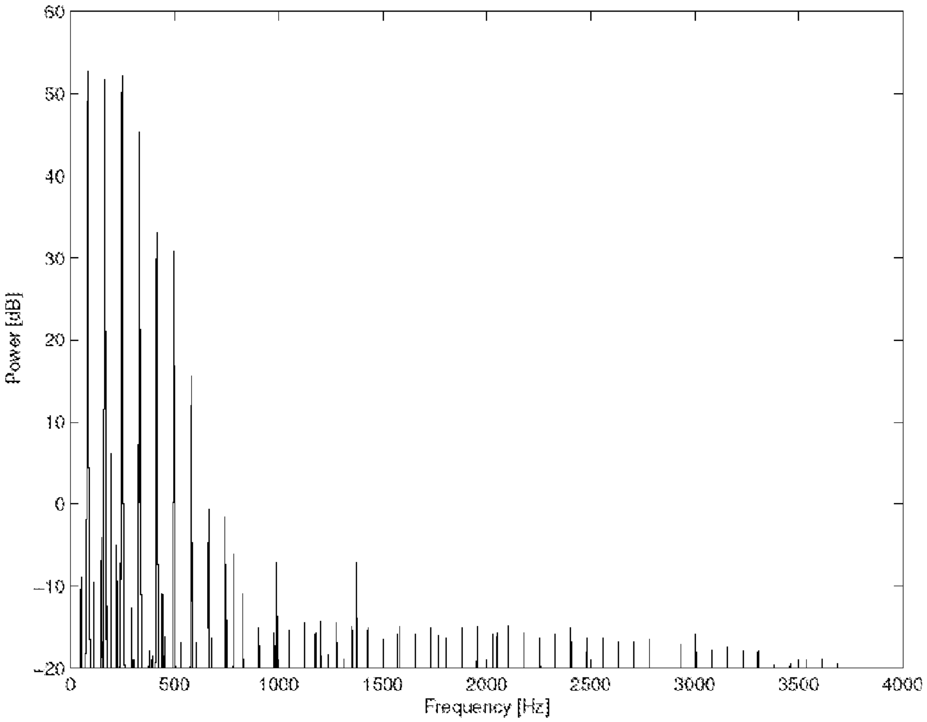
Figure 26:
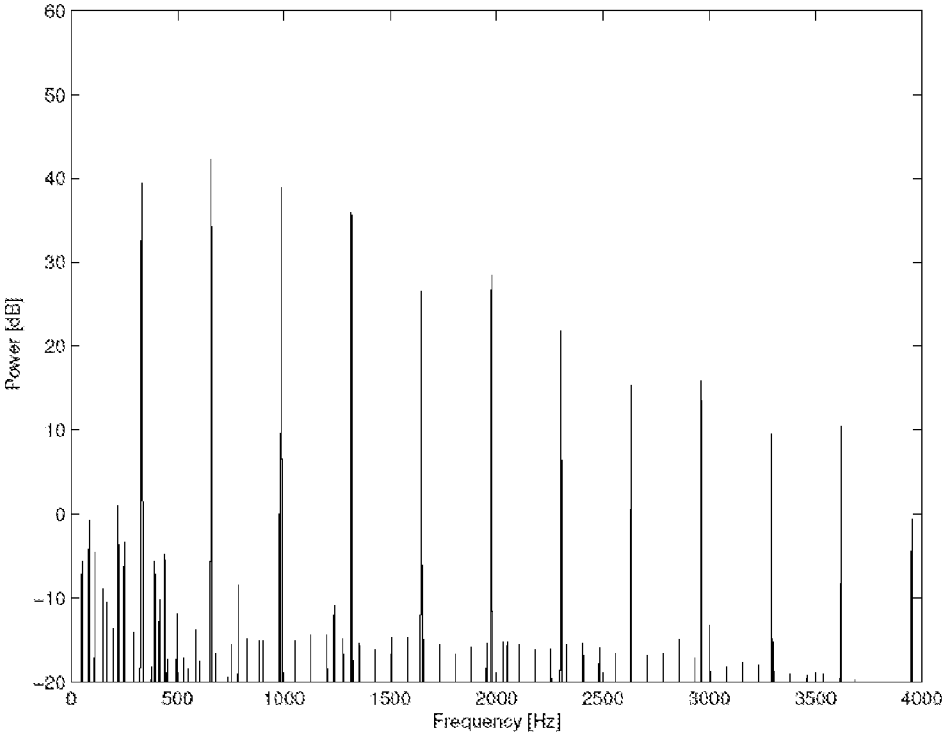

A signal from a single string will primarily consist of a fundamental frequency and a sequence of partials with essentially integer multiples of the fundamental frequency. In the time domain this signal exhibits a repetitive pattern which in an autocorrelation analysis (or similar) also exhibits a simple repeated pattern. In the frequency domain, such a signal with a number of (almost) harmonic partials is also easily recognised. FIG. 25 shows the frequency spectrum of the low E string played on a guitar. FIG. 26 shows the frequency spectrum of the high E string played on a guitar. In both cases the pattern of harmonic partials is clearly seen. At a low level compared to the harmonic partials of the string plucked, signals from the other strings are seen. This is due to the mechanical coupling between the strings in the guitar.

Figure 27:
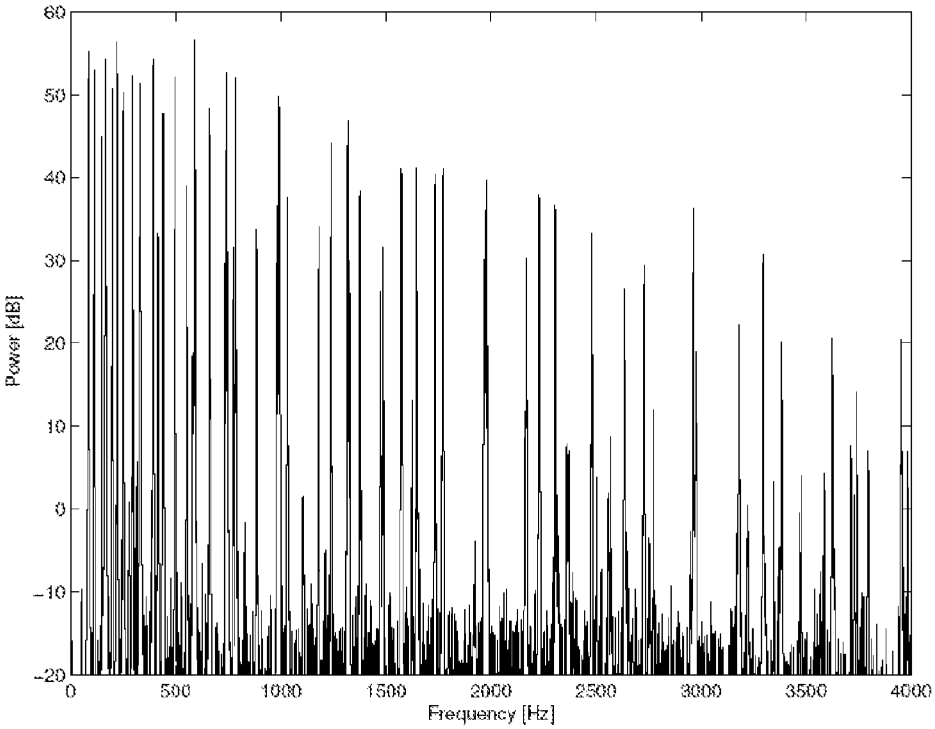

A signal from two or more strings with no simple harmonic relationship is much more complex in nature than the signal from a single string. FIG. 27 shows the frequency spectrum of the signal from a guitar when all six strings (E, A, D, G, B, E) are playing simultaneously.

A simple way to distinguish between a monophonic and a polyphonic input signal would be to sense the output level of the six bandpass filters, one for each string. This method is not suitable in all situations, however, e.g. if all strings but one are out of tune, as the outputs of one bandpass filter will be strong whereas the outputs of the remaining bandpass filters would be close to zero. Such a simple classification mechanism would falsely indicate a monophonic signal in this case.

Another simple way of classifying the input signal is to simply have the monophonic detector active all the time, and whenever it is able to establish a monophonic characteristic the input signal is classified as being monophonic, but if the monophonic detector is not able to distinguish a distinct monophonic characteristic the input signal is classified as being polyphonic, and the polyphonic pitch detector can be employed.

A better, and preferred, method to perform the classification between monophonic and polyphonic is to perform a correlation (or Fourier, or ASDF) analysis of the complete input signal and examining the resulting time of frequency domain pattern.

If a frequency spectrum is available, for example from a Fourier transform of the input signal, another simple method for determining the nature of the input signal can be used, in that the number of spectral peaks can be counted. The polyphonic signal for all six strings contains considerably more high spectral peaks than the spectrum for a single string.

The signal type classification means STCM may be implemented as a part of either the monophonic pitch detector MPD or the polyphonic pitch detector PPD.

Distinguishing between signals from a guitar and a bass guitar in polyphonic mode The standard tuning of guitar strings is, from low to high frequencies, E, A, D, G, B, E. Another very common musical instrument is the bass guitar (and the double bass) which due to the construction typically does not need tuning as often as a guitar, but tuning is of course needed.

The standard tuning of the four-string bass guitar (and double bass) is: E, A, D, G, which corresponds to the four lowest strings on a guitar, just tuned one octave lower. Some basses have five or six strings, however. A common tuning for a five-string bass is: B, E, A, D, G. The frequency range has thus been extended downwards by means of the B string below the E string. A common tuning for a six-string bass is: B, E, A, D, G, C. Compared to the five-string bass, the frequency range has been extended upwards by means of the C string above the G string. Compared to the tuning of a guitar this is a difference, as the guitar has a B string above the G string.

Due to these differences in the tones (chromas) in the nominal tunings of guitars and basses, the polyphonic tuner needs information on whether a guitar signal or a bass signal is input to the tuning device. A change of analysis frequencies should be made depending on this information. It is desirable if this change can occur automatically, based on the characteristics of the input signal.

A method to distinguish between guitar and bass signals is to measure the spectral characteristics of the input signal, and determine where the major part of the signal energy occurs at lower or higher frequencies. The so-called spectral centroid, known from the area of music information retrieval is a useful measurement of the spectral characteristics in this context. Other methods comprise comparing the outputs of the bandpass filters, or determining the lowest partial in the input signal.

A particularly advantageous embodiment of the invention therefore comprises means to change detection and display mode automatically depending on whether the input signal consist of the signal from a guitar or from a bass.

Final Remark

It is to be understood that details of the embodiments, hereunder different combinations of features, different sequences and different configuration parameters may differ from the described herein without deviating from the spirit of the invention.

The invention claimed is:

1. A method for operating a musical instrument tuner, the tuner comprising an input module, a signal analyzer, a display, and a housing;

the input module, the signal analyzer and the display forming a part of said housing or being comprised in said housing;

the input module receiving an input signal from a musical instrument;

the display enabling at least two display modes from a group of display modes, the display modes comprising a monophonic display mode and a polyphonic display mode;

the method comprising the steps of initiating a user session mode;

the user session mode being selected among a set of user session modes at least comprising a polyphonic mode and a monophonic mode;

automatically determining a user session mode and shifting the user session mode from one of the previously selected user session modes to the automatically determined user session mode;

when the user session mode is selected to be the polyphonic mode, determining a polyphonic characteristic of the input signal, the polyphonic characteristic including representations of multiple pitch frequencies derived from said input signal, and displaying said polyphonic characteristic in a polyphonic display mode on said display, when the user session mode is selected to be the monophonic mode, determining a monophonic characteristic of the input signal, the monophonic characteristic including a representation of a pitch frequency derived from said input signal, and displaying said monophonic characteristic in a monophonic display mode on said display;

determining a signal class of the input signal by means of a signal classifier, the signal class being from a group of classes at least comprising one or more monophonic signal classes and one or more polyphonic signal classes;

and basing the step of automatically determining a user session mode on said determined signal class.

2. The method according to claim 1, wherein the representation of a pitch frequency is different in the monophonic display mode than in the polyphonic display mode.

3. The method according to claim 1, wherein said signal analyzer is coupled to or comprises said signal classifier and is arranged to determine said at least one characteristic in dependency of said signal class determined by said signal classifier.

4. The method according to claim 1, wherein said step of automatically determining a user session mode is based on said determined signal class by automatically selecting a monophonic mode from the set user session modes when said signal class is determined as one of the monophonic signal classes; and automatically selecting a polyphonic mode from the set user session modes when said signal class is determined as one of the polyphonic signal classes.

5. The method according to claim 1, comprising determining said signal class by calculating a time domain function or a frequency domain transform of said input signal and depending on said function or transform performing pattern recognition.

6. The method according to claim 1, wherein the musical instrument tuner comprises a user interface comprising a mode selector.

7. The method according to claim 6, wherein said mode selector comprises a manual switch operated by a user.

8. The method according to claim 6, wherein said mode selector facilitates overruling said automatically determined user session mode.

9. The method according to claim 1, wherein said multiple different pitch frequencies originates from strumming of two or more strings of a musical instrument.

10. The method according to claim 1, wherein said musical instrument tuner is automatically detecting said target pitch frequency in the monophonic mode.

11. The method according to claim 1, wherein said multiple pitch frequencies of said polyphonic characteristic refers to predetermined target pitch frequencies.

12. The method according to claim 1, wherein said pitch frequency of said monophonic characteristic refers to a predetermined target pitch frequency.

13. The method according to claim 1, wherein said representation of a pitch frequency comprises a deviation from a target pitch frequency when said user session mode is monophonic; and said representations of multiple pitch frequencies comprises multiple deviations from multiple target pitch frequencies when said user session mode is polyphonic.

14. The method according to claim 13, wherein said target pitch frequency or multiple target pitch frequencies are determined automatically on the basis of said pitch frequency or determined by a user.

15. The method according to claim 1, wherein said set of user session modes comprises a bypass user session mode.

16. The method according to claim 1, wherein said set of user session modes comprises two or more polyphonic user session modes, comprising at least a polyphonic guitar mode and a polyphonic bass guitar mode.

17. The method according to claim 1, wherein said signal analyzer comprises a monophonic pitch detector and a polyphonic pitch detector.

18. The method according to claim 1, wherein said input signal is a single channel audio signal.

19. The method according to claim 1, wherein a polyphonic display mode and a monophonic display mode may be displayed at the same time or one at a time by the display.

20. A musical instrument tuner comprising an input module arranged to receive an input signal from a musical instrument, a signal analyzer, a display arranged to enable at least two display modes from a group of display modes, the display modes comprising a monophonic display mode and a polyphonic display mode, a housing, and a signal classifier;

wherein the input module, the signal analyzer and the display is arranged to form a part of said housing or being comprised in said housing;

wherein said signal classifier is arranged to allow an automatic selection of a user session mode of said musical instrument tuner among a set of user session modes, the user session modes comprising a polyphonic mode and a monophonic mode;

wherein said signal analyzer is arranged to determine one or more characteristics of said input signal in accordance with a selected user session mode; and wherein the display is arranged to convey information about said characteristics in accordance with a display mode selected according to said selected user session mode;

wherein said signal classifier is arranged to determine a signal class of the input signal from a group of classes at least comprising one or more monophonic signal classes and one or more polyphonic signal classes, and wherein the automatic selection of a user session mode is based on said signal class.

21. The musical instrument tuner according to claim 20, wherein the representation of a pitch frequency is different in the monophonic display mode than in the polyphonic display mode.

22. The musical instrument tuner according to claim 20, wherein the signal classifier is arranged to calculate a time domain function or a frequency domain transform of said input signal and depending on said function or transform performing pattern recognition to determine a user session mode from the set of user session modes.

23. The musical instrument tuner according to claim 20, wherein the musical instrument tuner comprises a user interface comprising a mode selector.

24. The musical instrument tuner according to claim 23, wherein said mode selector facilitates overruling said automatically selected user session mode.

25. The musical instrument tuner according to claim 20, wherein said one or more characteristics in a polyphonic display mode comprises representations of multiple pitch frequencies or multiple deviations from multiple target pitch frequencies.

26. The musical instrument tuner according to claim 20, wherein said one or more characteristics in a monophonic display mode comprises representations of a pitch frequency or a deviation from a target pitch frequency.

27. The musical instrument tuner according to claim 25, wherein said target pitch frequency or multiple target pitch frequencies are determined automatically on the basis of said characteristics or determined by a user.

28. The musical instrument tuner according to claim 20, wherein said set of user session modes comprises a bypass user session mode.

29. The musical instrument tuner according to claim 20, wherein said set of user session modes comprises two or more polyphonic user session modes, comprising at least a polyphonic guitar mode and a polyphonic bass guitar mode.

30. The musical instrument tuner according to claim 26, wherein said target pitch frequency or multiple target pitch frequencies are determined automatically on the basis of said characteristics or determined by a user.

31. A method for operating a musical instrument tuner, the tuner comprising an input module, a signal analyzer, a display, and a housing;

the input module, the signal analyzer and the display forming a part of said housing or being comprised in said housing;

the input module receiving an input signal from a musical instrument;

the display enabling at least two display modes from a group of display modes, the display modes comprising a monophonic display mode and a polyphonic display mode;

the method comprising the steps of initiating a user session mode;

the user session mode being selected among a set of user session modes at least comprising a polyphonic mode and a monophonic mode;

automatically determining a user session mode and shifting the user session mode from one of the previously selected user session modes to the automatically determined user session mode;

when the user session mode is selected to be the polyphonic mode, determining a polyphonic characteristic of the input signal, the polyphonic characteristic including representations of multiple pitch frequencies derived from said input signal, and displaying said polyphonic characteristic in a polyphonic display mode on said display, when the user session mode is selected to be the monophonic mode, determining a monophonic characteristic of the input signal, the monophonic characteristic including a representation of a pitch frequency derived from said input signal, and displaying said monophonic characteristic in a monophonic display mode on said display;

wherein the representation of a pitch frequency is different in the monophonic display mode than in the polyphonic display mode.

* * * * *